US005845290A

United States Patent [19]

Yoshii

[11] Patent Number: 5,845,290

[45] Date of Patent: Dec. 1, 1998

[54] FILE RECORDING SUPPORT APPARATUS AND FILE RECORDING SUPPORT SYSTEM FOR SUPPORTING RECORDING OF FILE ON HOME PAGE ON INTERNET AND INTRANET

[75] Inventor: Kiyotoshi Yoshii, Kyoto, Japan

[73] Assignee: Xaxon R&D Ltd., Kyoto, Japan

[21] Appl. No.: 755,606

[22] Filed: Nov. 25, 1996

[30] Foreign Application Priority Data

| | | | |
|---|---|---|---|
| Dec. 1, 1995 | [JP] | Japan | 7-314588 |
| Feb. 29, 1996 | [JP] | Japan | 8-043069 |
| May 17, 1996 | [JP] | Japan | 8-123769 |
| Aug. 30, 1996 | [JP] | Japan | 8-229809 |

[51] Int. Cl.[6] ...... G06F 17/30

[52] U.S. Cl. ...... 707/104; 345/333

[58] Field of Search ...... 707/1, 100, 200, 707/5, 10, 104, 206; 1/1; 380/4, 49; 395/200.36, 200.48, 680; 345/326, 333

[56] References Cited

U.S. PATENT DOCUMENTS

| | | | |
|---|---|---|---|
| 5,572,643 | 11/1996 | Judson | 395/200.48 |
| 5,701,451 | 12/1997 | Rogers et al. | 1/1 |
| 5,708,780 | 1/1998 | Levergood et al. | 1/1 |
| 5,708,825 | 1/1998 | Sotomayor | 1/1 |
| 5,717,860 | 2/1998 | Graber et al. | 1/1 |

*Primary Examiner*—Thomas G. Black
*Assistant Examiner*—Ruay Lian Ho
*Attorney, Agent, or Firm*—Beveridge, DeGrandi, Weilacher & Young, LLP

[57] ABSTRACT

A file recording support apparatus for supporting recording of a file on a home page on an internet and an intranet according to the present invention comprises means for entering a recording start command, means for entering a recording stop command, and recording means for recording a file acquired from a server, together with link information included in the file, in storage means in a period elapsed from the time when the recording start command is entered until the recording stop command is entered.

15 Claims, 25 Drawing Sheets

FIG. 25

```
<HTML>
<HEAD>
<!-- DOCTYPE Site Map File Ver 1.0 -->
<TITLE> Sample Site Map File </TITLE>
<BASE HREF ="http://www.aaa.co.jp/index.html">
</HEAD>
<BODY>
<DL>
    <DT> <A HREF="index.html"> index.html </A>
    <DD><UL>
       <LI> <A HREF="a.html"> a.html </A>
       <LI> <A HREF="b.html"> b.html </A>
       </UL>

    <DT> <A HREF="a.html"> a.html </A>
    <DD><UL>
       <LI> <A HREF="a-1.html"> a-1.html </A>
       <LI> <A HREF="a-2.html"> a-2.html </A>
       </UL>

    <DT> <A HREF="a-1.html"> a-1.html </A>
    <DD><UL>
       <LI> <A HREF="a-1-1.html"> a-1-1.html </A>
       </UL>

    <DT> <A HREF="a-1-1.html"> a-1-1.html </A>
    <DD>

    <DT> <A HREF="a-2.html"> a-2.html </A>
    <DD>

    <DT> <A HREF="b.html"> b.html </A>
    <DD><UL>
      <LI> <A HREF="b-1.gif"> b-1.gif </A>
      <LI> <A HREF="a.html"> a.html </A>
      </UL>

    <DT> <A HREF="b-1.gif"> b-1.gif </A>
    <DD>

</DL>
</BODY>
</HTML>
```

FILE RECORDING SUPPORT APPARATUS AND FILE RECORDING SUPPORT SYSTEM FOR SUPPORTING RECORDING OF FILE ON HOME PAGE ON INTERNET AND INTRANET

BACKGROUND OF THE INVENTION

1. Field of the Invention

The present invention relates to a file recording support apparatus and a file recording support system for supporting recording of a file on a home page on an internet and an intranet, in which a file obtained through a network such as an internet can be recorded, for example.

2. Description of the Prior Art

Generally when a WWW (world wide web) service is utilized, an application on the client side which is called a WWW browser represented by Netscape Navigator (trade name) is utilized. A user designates, when he or she requests a file placed on a WWW server, its URL (Uniform Resource Locator) from the WWW browser. Consequently, a transmission request is sent to the server having the file from the browser, and the file having the designated URL is sent from the server.

Link information indicating the other file or the like is embedded in a hypertext type document in the file sent from the WWW server. The hypertext type document is described in a language called HTML. In the HTML, the link information is described using a start tag and an end tag. Information at a link destination (link information) is designated by the URL. Further, an anchor such as a keyword is inserted between the start tag and the end tag. When the keyword which is the anchor is clicked, a transmission request is sent to a server having a file at the link destination, and the file is sent to the browser from the server.

A conventional browser has a function of recording a file obtained by a user performing operations in a hard disk for each file unit. In extracting information by such a method, however, it takes very long time.

For example, in a period of time during which the user most frequently utilizes an internet between 9:00 p.m. to 12:00 a.m., the degree to which connection to a provider succeeds is once per ten times. Further, a period of time during which the user desires to utilize the internet in a greatest common divisor manner is a period of time during which the line of the internet is crowded. Even if the user attempts to access a popular home page, he or she may not, in most cases, be easily connected thereto. Even if the user is connected thereto, it takes significantly long to down-load information included in each page because the line is crowded. Further, data constituting each page such as text data, image data and voice data can be recorded only one page at a time.

In order that a user can arrange and retrieve information recorded in a hard disk of his or her own and can see the information, just as the user sees it online, link information included in each page must be changed. This takes a lot of time and labor and is not possible by everyone Furthermore, almost all of current home pages on WWW are created in consideration of only the fact that they are read online. Users who desire to record the home pages in hard disks feel great inconvenience. Providers of the home pages have not so far had the idea of creating the home pages on the premise that they can be down-loaded and seen on hard disks.

Additionally, a period of time during which the cost of the line is currently the cheapest (for example, from 11:00 p.m. to 8:00 a.m.) is a period of time during which almost all persons usually sleep.

When an internet is generally used, a common user cannot, in most cases, be easily connected to a provider which he or she contracts as described above because a period of time during which the user desires to use the internet is a period of time during which the other persons generally desire to use the internet. Even after the user is connected to the provider, the user cannot be easily connected to a popular home page which he or she desires to see. Further, a period of time during which almost all of persons desire to use the internet is a period of time during which the fee for a telephone call must be charged in a weight system. Moreover, the internet is crowded, whereby it costs more to down-load data having the same capacity.

SUMMARY OF THE INVENTION

An object of the present invention is to provide a file recording support apparatus and a file recording support system for supporting recording of a file on a home page on an internet and an intranet, in which a file (an image, a voice, a text or the like) acquired from a server can be recorded in simple operations.

Another object of the present invention is to provide a file recording support apparatus and a file recording support system for supporting recording of a file on a home page on an internet and an intranet, in which even a beginner can easily acquire a file from a server and can record the file at arbitrarily set time in a period of time excluding a period of time during which the line is crowded and the cost thereof is high.

Still another object of the present invention is to provide a file recording support apparatus and a file recording support system for supporting recording of a file on a home page on an internet and an intranet, in which a file on a network can be seen at much higher response speed than that in a case where the file is seen through the network.

A further object of the present invention is to provide a file recording support apparatus and a file recording support system for supporting recording of a file on a home page on an internet and an intranet, in which a file at a link destination included in a recorded file can be simply and quickly taken out.

A first file recording support apparatus for supporting recording of a file on a home page on an internet and an intranet according to the present invention comprises means for entering a recording start command, means for entering a recording stop command, and recording means for recording a file acquired from a server, together with link information included in the file, in storage means in a period elapsed from the time when the recording start command is entered until the recording stop command is entered. The file includes an image, for example, in addition to a hypertext type document.

A second file recording support apparatus for supporting recording of a file on a home page on an internet and an intranet according to the present invention comprises setting means for setting the recording start time and a URL of a file whose recording is reserved, means for acquiring a file corresponding to the URL set in the setting means from a server when the recording start time set in the setting means has come, and recording means for recording the acquired file, together with link information included in the file, in storage means.

A third file recording support apparatus for supporting recording of a file on a home page on an internet and an intranet according to the present invention comprises setting means for setting the recording start time and a URL of a file whose recording is reserved, means for acquiring a file corresponding to the URL set in the setting means when the recording start time set in the setting means has come, means for acquiring from a server a file at a link destination within a predetermined range out of link destinations included in the acquired file, and recording means for recording the acquired file, together with link information included in the file, in storage means.

Each of the above-mentioned file recording support apparatuses comprises, for example, means for reading the files recorded by the recording means.

Further, each of the above-mentioned file recording support apparatuses comprises, for example, means for retrieving a desired file out of the files recorded by the recording means on the basis of the entered keyword for retrieval.

Each of the above-mentioned file recording support apparatuses comprises, for example, means for producing the figure representing the linked state of the files recorded by the recording means and displaying the produced figure.

In a system in which a list file listing URLs of all files provided by a server or URLs of parts of all the files provided by the server is placed on the server, a fourth file recording support apparatus for supporting recording of a file on a home page on an internet and an intranet according to the present invention comprises means for acquiring the list file from the server, means for acquiring from the server files corresponding to the URLs of all or parts of the files included in the list file, and recording means for recording the acquired files, together with link information included in the files, in storage means. The list file is created by HTML, SGML or the like.

In a system in which a list file listing URLs of files in a predetermined group selected out of files provided by all servers on a network is placed on the predetermined server, a fifth file recording support apparatus for supporting recording of a file on a home page on an internet and an intranet according to the present invention comprises means for acquiring the list file from the server on which it is placed, means for acquiring files corresponding to the URLs of all or parts of the files included in the list file from the servers on which the files are placed on the network, and recording means for recording the acquired files, together with link information included in the files, in storage means. The list file is created by HTML, SGML or the like.

In a system in which a link file describing a link relationship among all files provided by a server or a link relationship among parts of all the files provided by the server is placed on the server, a sixth file recording support apparatus for supporting recording of a file on a home page on an internet and an intranet according to the present invention comprises means for acquiring the link file from the server, and means for producing a figure representing the link relationship among all the files provided by the server or the link relationship among parts of all the files provided by the server and displaying the produced figure on the basis of the acquired link file. The link file is created by HTML, SGML or the like.

In a system in which a link file describing a link relationship among files in a predetermined group selected out of files provided by all servers on a network is placed on the predetermined server, a seventh file recording support apparatus for supporting recording of a file on a home page on an internet and an intranet according to the present invention comprises means for acquiring the link file from the server on which it is placed, and means for producing a figure representing the link relationship among the files in the predetermined group and displaying the produced figure on the basis of the acquired link file. The link file is created by HTML, SGML or the like.

In a system in which a site map file describing URLs of files in a predetermined group selected out of files provided by all servers on a network and all or parts of link information included in the files is placed on the predetermined server, an eighth file recording support apparatus for supporting recording of a file on a home page on an internet and an intranet according to the present invention comprises means for acquiring the site map file from the server on which it is placed, means for producing a figure representing a link relationship among the files in the predetermined group and displaying the produced figure on the basis of the URLs and the link information included in the site map file, and recording means for acquiring files corresponding to the URLs included in the site map file from the servers on which the files are placed on the network and recording the acquired files, together with link information included in the files, in storage means.

A first file recording support system for supporting recording of a file on a home page on an internet and an intranet according to the present invention comprises a server device, and a client device connected to the server device through a network, a list file listing URLs of all files provided by the server device or URLs of parts of all the files provided by the server device being held in the server device, the client device comprising means for acquiring the list file from the server device, means for acquiring from the server device files corresponding to the URLs of all or parts of the files included in the list file, and recording means for recording the acquired files, together with link information included in the files, in storage means. The list file is created by HTML, SGML or the like.

A second file recording support system for supporting recording of a file on a home page on an internet and an intranet according to the present invention comprises server devices, and a client device connected to the server devices through a network, a list file listing URLs of files in a predetermined group selected out of files provided by all the server devices on the network being held in the predetermined server device, the client device comprising means for acquiring the list file from the server device on which it is placed, means for acquiring files corresponding to the URLs of all or parts of the files included in the list file from the server devices on which the files are placed on the network, and recording means for recording the acquired files, together with link information included in the files, in storage means. The list file is created by HTML, SGML or the like.

A third file recording support system for supporting recording of a file on a home page on an internet and an intranet according to the present invention comprises a server device, and a client device connected to the server device through a network, a link file describing a link relationship among all files provided by the server device and a link relationship among parts of all the files provided by the server device being held in the server device, the client device comprising means for acquiring the link file from the server device, and means for producing a figure representing the link relationship among all the files provided by the server device or the link relationship among parts of all the files provided by the server device and displaying the produced figure. The link file is created by HTML, SGML or the like.

A fourth file recording support system for supporting recording of a file on a home page on an internet and an intranet according to the present invention comprises server devices, and a client device connected to the server devices through a network, a link file describing a link relationship among files in a predetermined group selected out of files provided by all the server devices on the network being held in the predetermined server device, the client device comprising means for acquiring the link file from the server device on which it is placed, and means for producing a figure representing the link relationship among the files in the predetermined group and displaying the produced figure on the basis of the acquired link file. The link file is created by HTML, SGML or the like.

A fifth file recording support system for supporting recording of a file on a home page on an internet and an intranet according to the present invention comprises server devices, and a client device connected to the server devices through a network, a site map file describing URLs of files in a predetermined group selected out of files provided by all the server devices on the network and all or parts of link information included in the files being held in the predetermined server device, the client device comprising means for acquiring the site map file from the server device on which it is placed, means for producing a figure representing a link relationship among the files in the predetermined group and displaying the produced figure on the basis of the URLs and the link information included in the site map file, and recording means for acquiring files corresponding to the URLs included in the site map file from the server devices on which the files are placed and recording the acquired files, together with link information included in the files, in storage means. The site map file is created by HTML, SGML or the like.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 25 is a diagram showing one example of a site map file;

PREFERRED EMBODIMENTS OF THE PRESENT INVENTION

Figure 1:
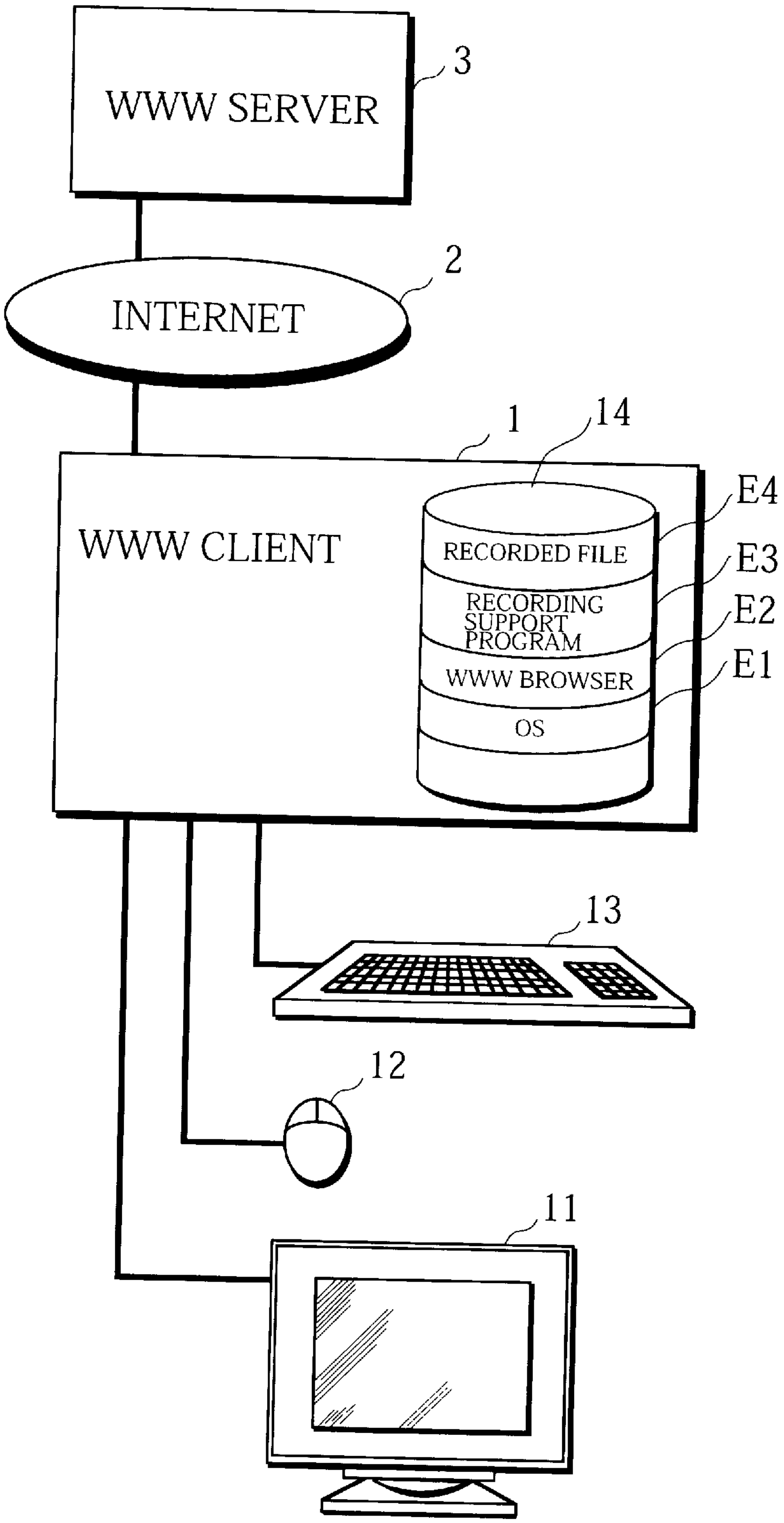
FIG. 1 is a block diagram showing the entire construction of a system.

Referring now to the drawings, embodiments of the present invention will be described.

FIG. 1 illustrates the construction of a whole system.

The system comprises a WWW client 1 comprising a personal computer and the like and a WWW server 3 connected to the WWW client 1 through an internet 2.

A display 11, a mouse 12 and a keyboard 13 are connected to the personal computer in the WWW client 1. The personal computer in the WWW client 1 comprises a CPU, a hard disk 14, a memory, and the like. The hard disk 14 includes an area E1 storing an OS (an operating system), an area E2 storing a WWW browser, an area E3 storing an application for realizing the present invention (hereinafter referred to as a recording support program), an area (a recording area) E4 storing a file recorded by the recording support program (a recorded file), and the like.

The WWW client 1 performs the following functions by the recording support program.

(a) a function of recording a file obtained by the WWW browser (a immediate recording function)

(b) a function of making the WWW browser obtain a file reserved at the reservation time and recording the obtained file (a reserved recording function)

(c) a function of reading the files recorded in the foregoing items (a) and (b) using the WWW browser and retrieving and reading the desired file from the files recorded in the foregoing items (a) and (b) (a reading and retrieving function)

(d) a function of hierarchically displaying the URLs of the files recorded in the foregoing items (a) and (b) (a map preparing function)

(e) a function achieved by making the WWW server prepare a predetermined file

Description is now made of the foregoing functions (a) to (e).

(1) Description of Immediate Recording Function

Figure 2:
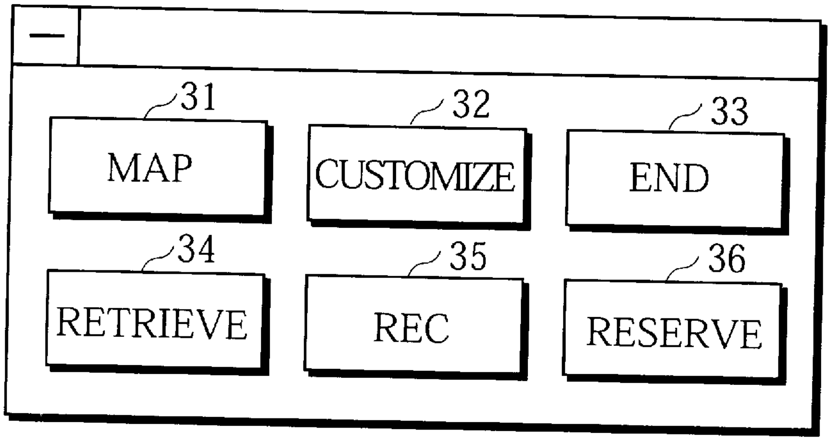
FIG. 2 is a typical view showing a main window displayed by a recording support program.

When the recording support program is started, a main window as shown in FIG. 2 is opened beside a window of the WWW browser on the display 11.

The main window is provided with a map preparing (MAP) button 31, a customizing button 32, an end button 33, a retrieving button 34, a recording (Rec) button 35, and a recording reserving button 36.

Figure 3:
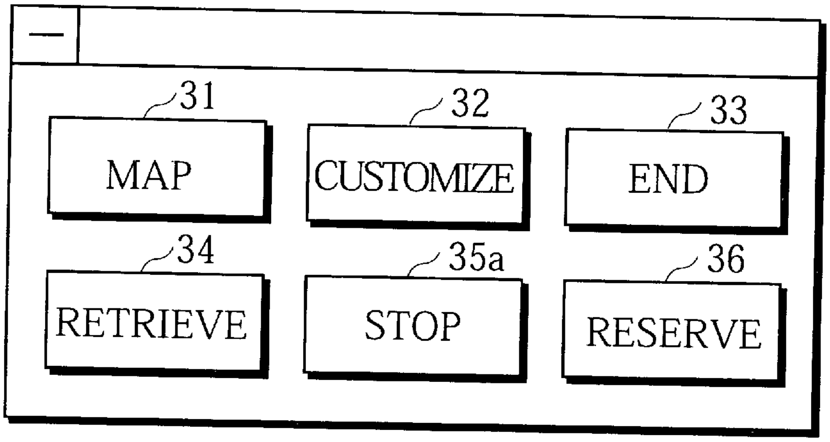
FIG. 3 is a typical view indicating, when a recording button is depressed, that the recording button is changed to a stop button.

When the recording button 35 is depressed, recording is started, and the recording button 35 is changed into a stop button 35*a* as shown in FIG. 3. When the stop button 35*a* is depressed, the recording is terminated, and the stop button 35*a* is returned to the recording button 35 as shown in FIG. 2.

Figure 4:
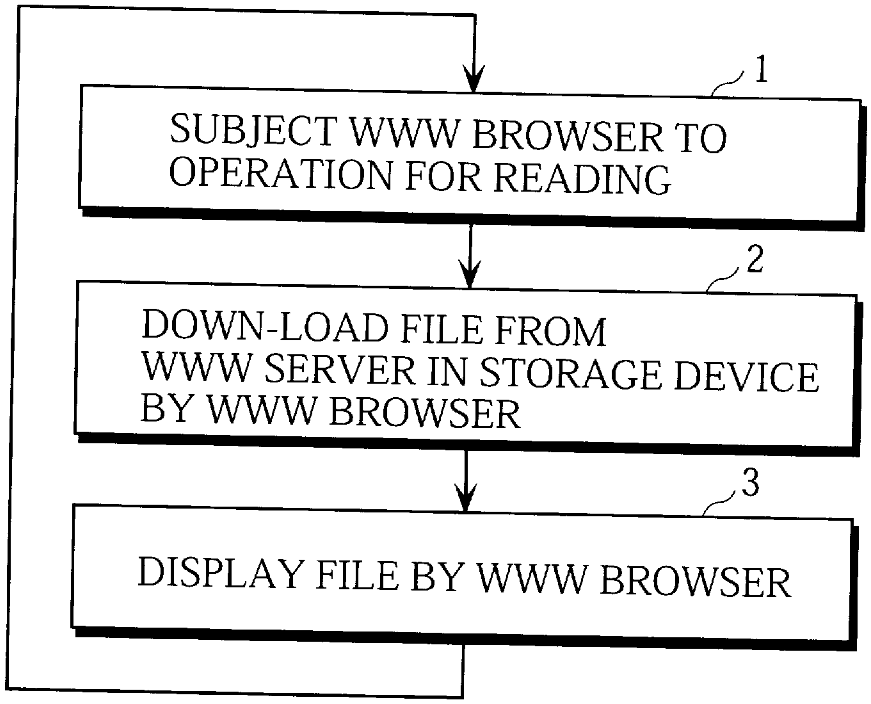
FIG. 4 is a flow chart showing the procedure for processing in a normal state where the recording button is not depressed.

FIG. 4 shows the procedure for processing in a normal state where the recording button 35 is not depressed. This processing shall be referred to as processing at the time of a browsing mode.

When the WWW browser is subjected to an operation for reading (step 1), and a corresponding file is sent from the WWW server 3, the file sent from the WWW server 3 is downloaded in a storage device (a memory, the hard disk 14) by the WWW browser (step 2). The file down-loaded in the storage device is displayed on the display 11 by the WWW browser (step 3).

Figure 5:
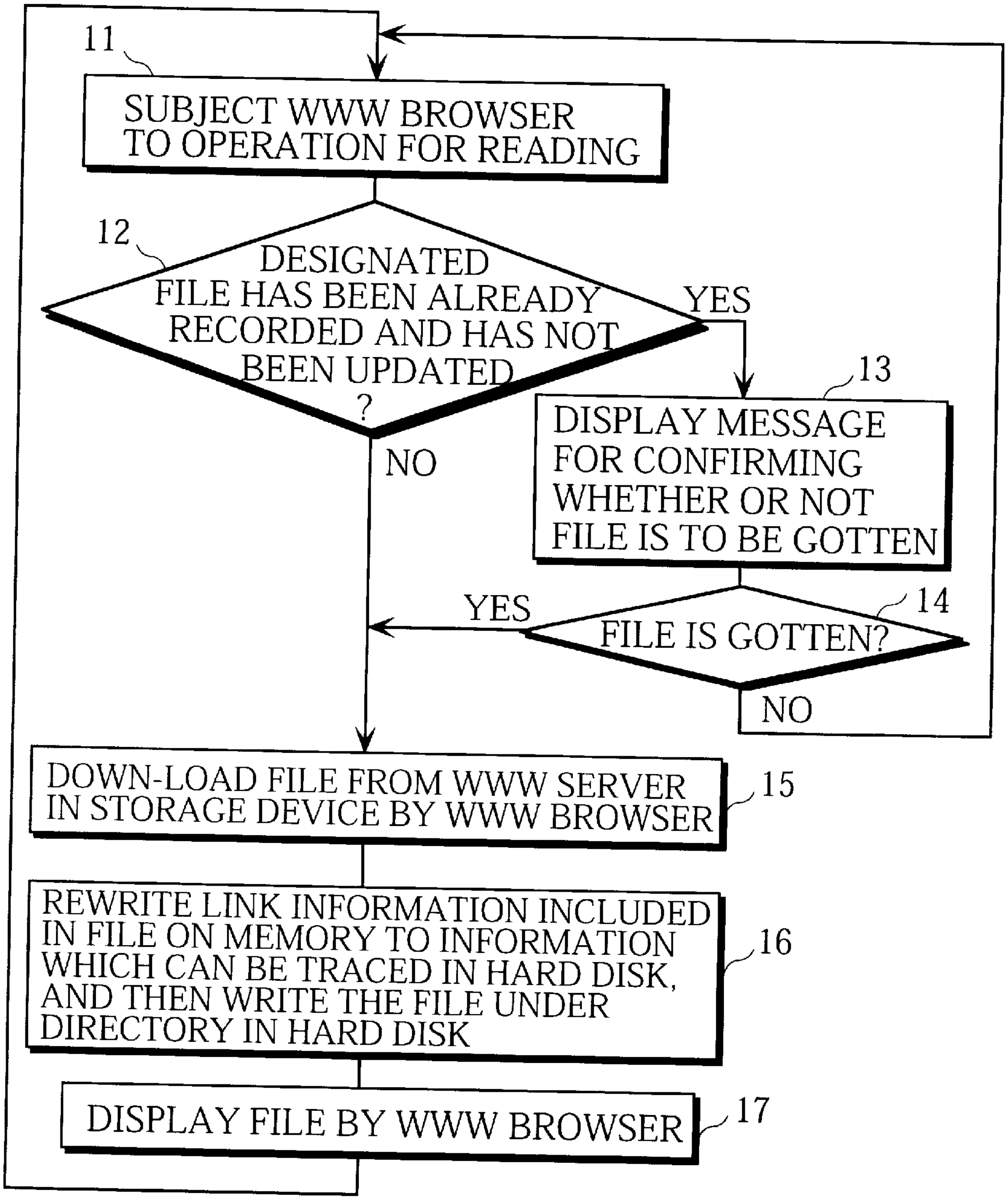
FIG. 5 is a flow chart showing the procedure for processing from the time when the recording button is depressed to the time when the stop button is depressed.

FIG. 5 shows the procedure for processing from the time when the recording button 35 is depressed to the time when the stop button 35*a* is depressed. This processing shall be referred to as processing at the time of an immediate recording mode.

When the WWW browser is subjected to an operation for reading (step 11), it is examined whether or not a designated file has been already recorded (step 12), and it is examined in a case where the file has been recorded whether or not the contents of a file having the same URL as that of the recorded file have been updated on the server side (step 12). When the designated file has not been recorded yet, or when even in a case where the file has been recorded, the contents of the file having the same URL as that of the recorded file have been updated on the sever side, the program proceeds to the step 15.

When the designated file has been already recorded, and the contents of the file having the same URL as that of the recorded file have not been updated on the server side, a message for confirming whether or not the file is to be gotten is displayed (step 13). When the user chooses to get the file (YES in step 14) on the basis of the display, the program proceeds to the step 15. When the user chooses not to get the file (NO in step 14), the program is returned to the step 11.

In the step 15, a corresponding file is gotten from the WWW server 3, and the file sent from the WWW server 3 is down-loaded in the storage device by the WWW browser.

Link information included in the down-loaded file is left as a comment in the file, and the link information included in the file, which represents the position of a file at a link destination placed on the side of the WWW server 3 on the internet, is rewritten to information representing the position where the file at the link destination is stored in the hard disk 14 on the side of the WWW client 1, after which the file is written under a directory corresponding to the URL of the file in the hard disk 14 (step 16).

Thereafter, the file down-loaded in the step 15 is displayed on the display 11 by the WWW browser (step 17). Thereafter, the processing in the steps 11 to 17 is repeatedly performed every time the WWW browser is subjected to an operation for reading.

The link information included in the acquired file is rewritten to the information which can be traced in the hard disk 14 on the side of the WWW client 1. If a translation table relating to the conformity of a link relationship is previously prepared, however, the link information included in the acquired file need not be rewritten. A translation table relating to the conformity of a link information is a table describing the relationship between link information included in an acquired file and information representing the position where a file at a link destination indicated by the link information is stored in the hard disk 14 on the side of the WWW client 1.

(2) Description of Reserved Recording Function

In order to make reserved recording, a user depresses the recording reserving button 36 from the main window shown in FIG. 2, to open a window for recording reservation to set the recording start time and a URL of a file to be recorded. Further, the reserved recording function also has a function of obtaining a file linked to a file corresponding to the set URL and recording the obtained file. The user sets a range in which the linked file is to be obtained.

Figure 6:
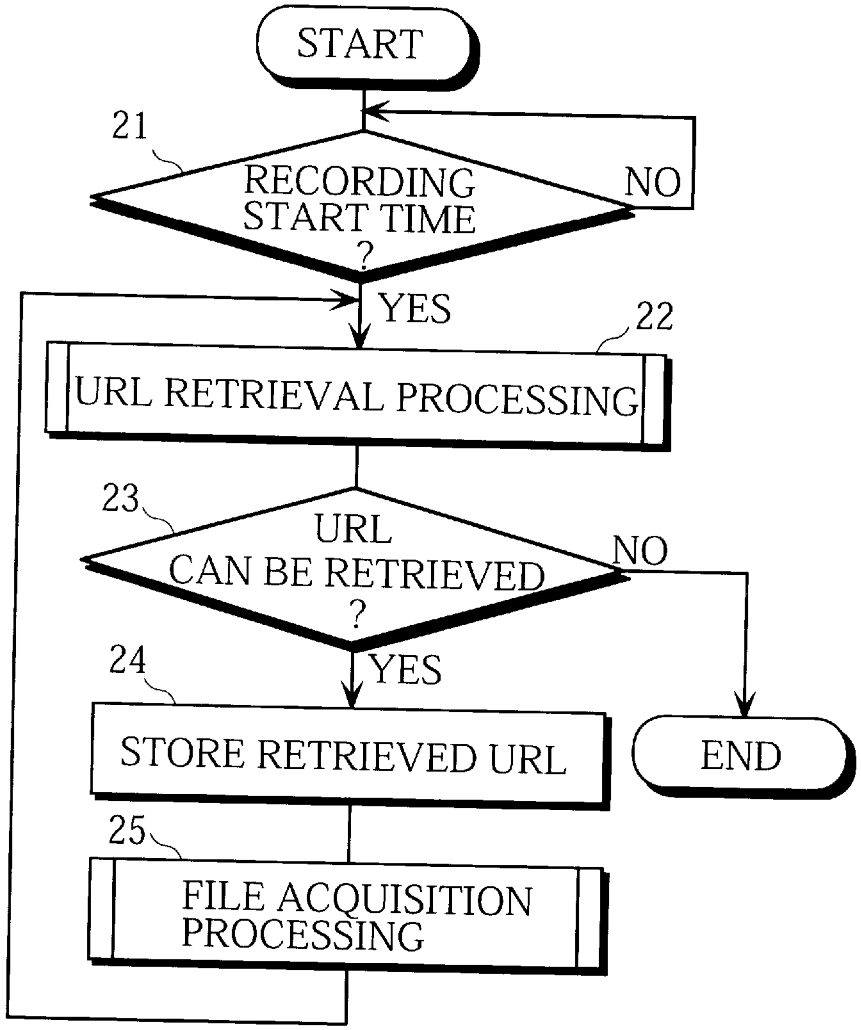
FIG. 6 is a flow chart showing the procedure for processing performed when the recording start time has come.

FIG. 6 shows the entire procedure for processing performed by the WWW client 1 when the set recording start time has come. This processing shall be referred to as processing at the time of a reserved recording mode.

When the set recording start time has come (step 21), retrieval processing of a URL of a file to be recorded at the time is performed (step 22). When the URL can be retrieved by URL retrieval processing (YES in step 23), the retrieved URL is stored (step 24). Further, file acquisition processing for acquiring a file corresponding to the retrieved URL and recording the acquired file is performed (step 25). Thereafter, the program is returned to the step 22. When the URL cannot be retrieved by the URL retrieval processing (NO in step 23), the current processing is terminated.

Figure 7:
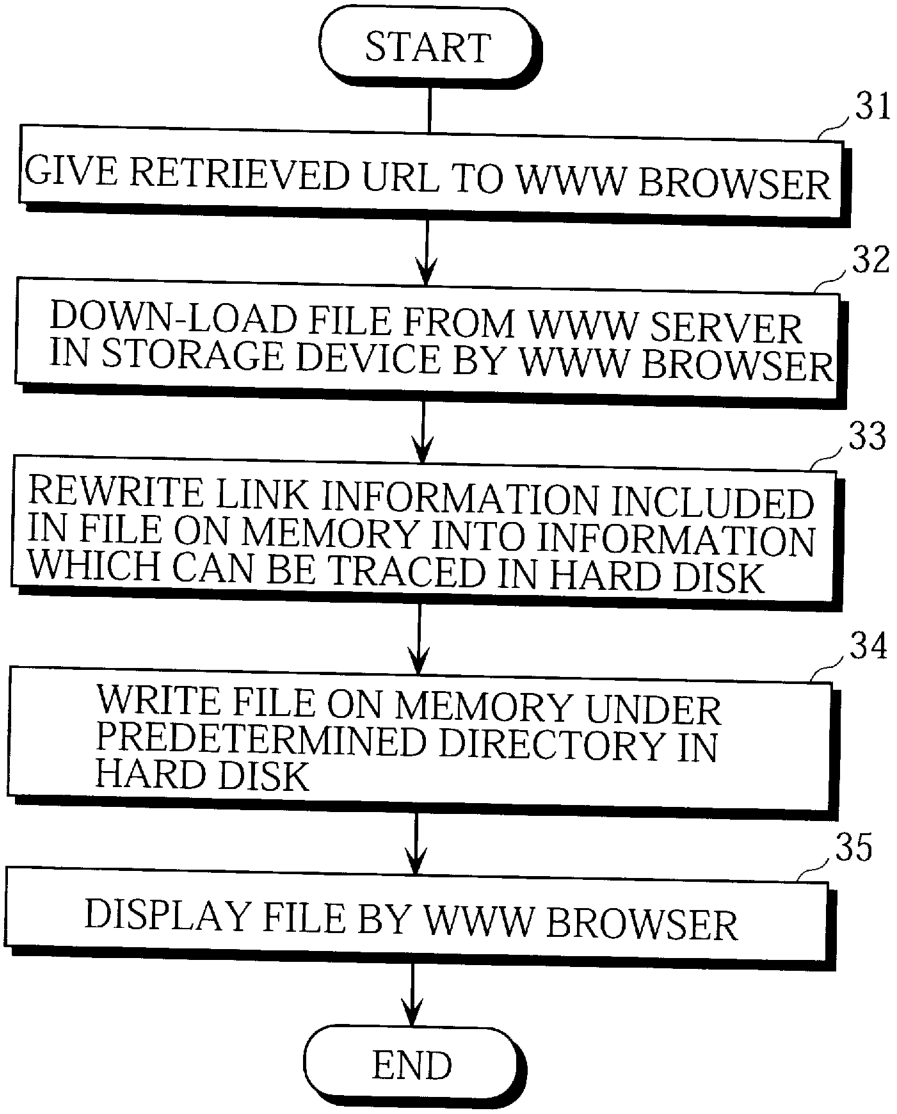
FIG. 7 is a flow chart showing the procedure for file acquisition processing shown in FIG. 6.

FIG. 7 shows the detailed procedure for the file acquisition processing in the step 25 shown in FIG. 6.

When the URL retrieved by the URL retrieval processing is given to the WWW browser (step 31), and a corresponding file is sent from the WWW server 3, the file sent from the WWW server 3 is down-loaded in the storage device by the WWW browser (step 32).

Link information included in the down-loaded file is left as a comment in the file, and the link information included in the file, which represents the position of a file at a link destination placed on the side of the WWW server 3 on the internet, is rewritten to information representing the position where the file at the link destination is stored in the hard disk 14 on the side of the WWW client 1 (step 33).

The file is written under a directory corresponding to the URL in the hard disk 14 and the acquired time (step 34). Thereafter, the file down-loaded in the step 32 is displayed on the display 11 by the WWW browser (step 35).

In a case where the URL retrieved by the URL retrieval processing has been already acquired and recorded by past access, after the URL is changed into the URL on the hard disk, and the link information in the file in the hard disk is rewritten to the original link information, the URL after the change may be given to the WWW browser. Consequently, the WWW browser reads out a file corresponding to the URL retrieved by the URL retrieval processing from the hard disk, whereby the processing is retrieved. Further, the link information is automatically changed by a recording support program, whereby the user is unconscious of the change.

Figure 8:
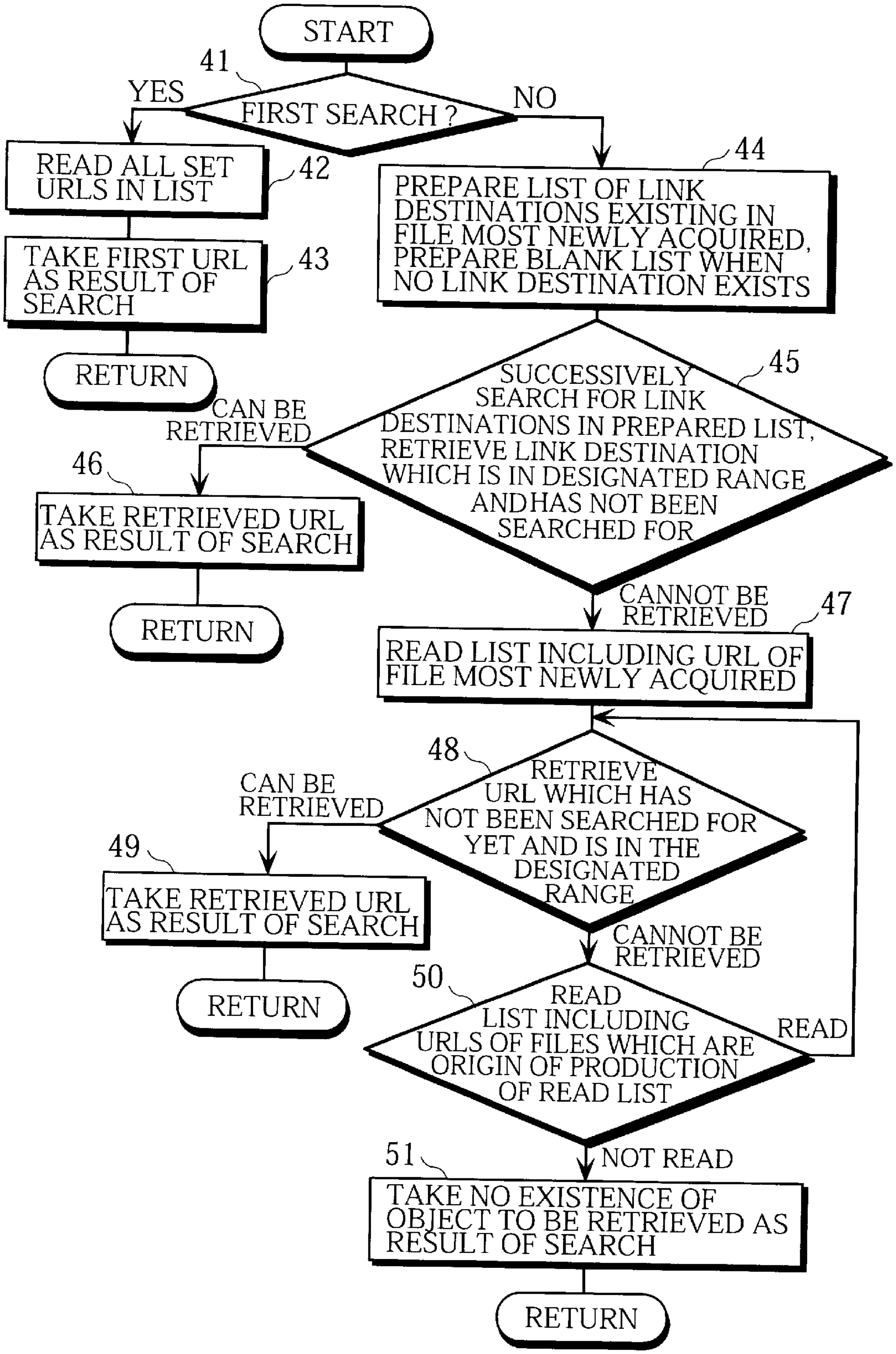
FIG. 8 is a flow chart showing the procedure for URL retrieval processing shown in FIG. 6.

FIG. 8 shows the detailed procedure for the URL retrieval processing in the step 22 shown in FIG. 6.

Figure 9:
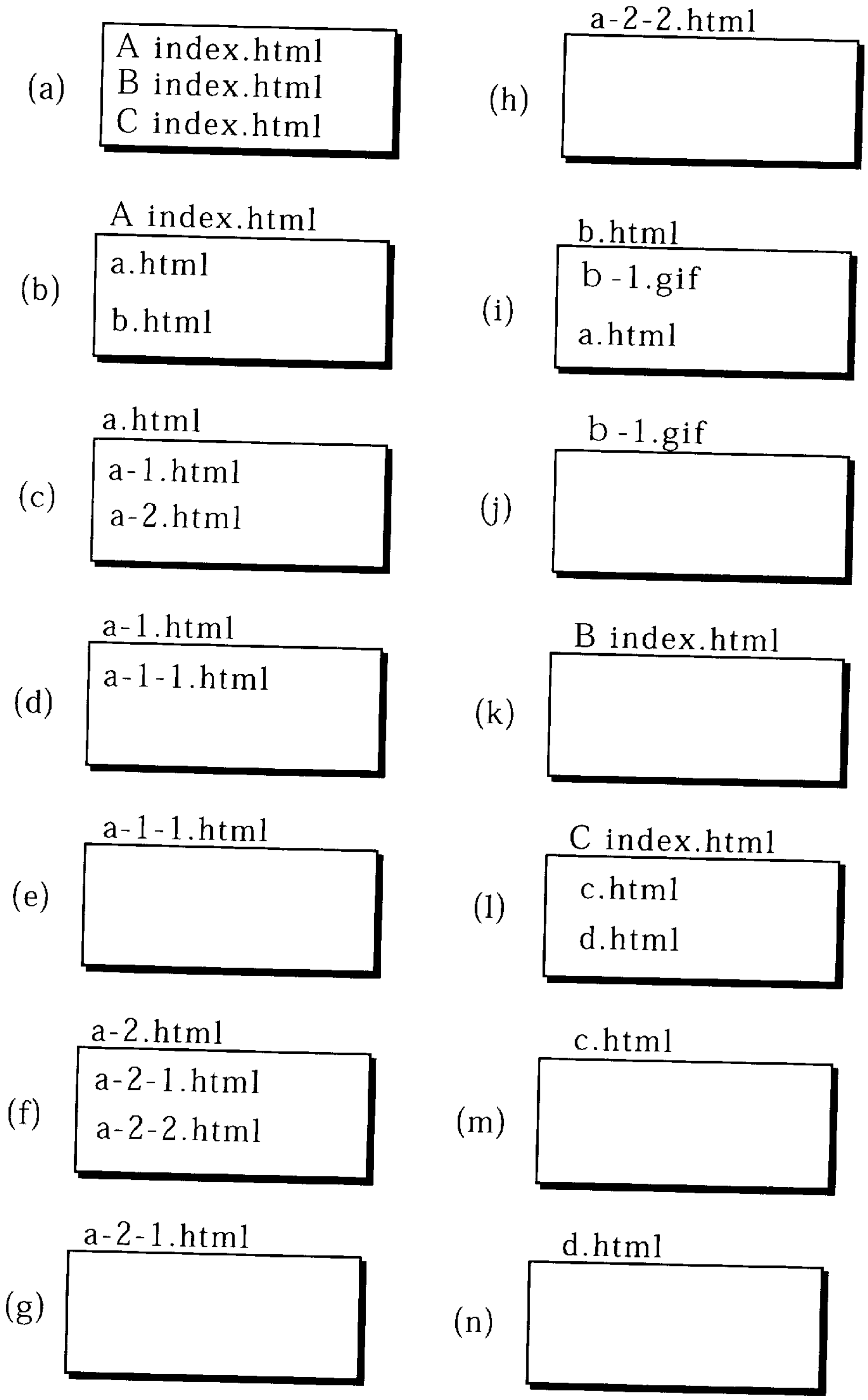
FIG. 9 is a typical view showing a file whose recording is reserved and a file linked thereto.

As shown in FIG. 9, the URL retrieval processing will be specifically described, assuming that three URLs (A index.html, B index.html, C index.html) are set by the user. FIG. 9 shows link destinations with respect to the three URLs set by the user. For example, the URL (A index.html) includes two URLs (a.html, b.html) as link destinations.

It is first judged in the step 41 whether or not the first search is made (step 41). When the first search is made, all the set URLs are read in a list (step 42). That is, the three URLs (A index.html, B index.html, C index.html) are read in a list.

The first URL (A index.html) is taken as the result of search (step 43). When a file is acquired and recorded by file acquisition processing on the basis of the result of search, the program proceeds to the step 41.

When the program proceeds to the step 41 after the file acquisition processing, the answer is in the negative in the step 41, after which the program proceeds to the step 44. In the step 44, a list of link destinations existing in a file most newly acquired by the file acquisition processing is prepared. When no link destination exists in the file most newly acquired, however, a blank list is prepared. In this example, a list of the two link destinations (a.html, b.html) included in the URL (A index.html) of the file most newly acquired is prepared.

The link destinations in the prepared list are successively searched for, and the link destination which is in the range designated by the user and has not been searched for yet is retrieved (step 45). A link destination which has been already retrieved is one at which there exists a file which has been already recorded and has not been updated on the server side. A range in which link destinations existing in a file are searched for is one in which hierarchies including the link destinations are the first and second hierarchies from a hierarchy including the file and files at the link destinations are in the same server.

In the step 45, the link destination (a.html) is retrieved. Consequently, the program proceeds to the step 46 from the step 45. In the step 46, the retrieved link destination (a.html) is taken as the result of search. When a file is acquired and recorded by file acquisition processing on the basis of the result of search, the program proceeds to the step 41.

The answer is in the negative in the step 41, after which the program proceeds to the step 44. In the step 44, a list of two link destinations (a-1.html, a-2.html) included in the URL (a.html) of the file most newly acquired is prepared, after which the program proceeds to the step 45. In the step 45, the link destination (a-1.html) is retrieved. Therefore, the program proceeds to the step 46 from the step 45. In the step 46, the retrieved link destination (a-1.html) is taken as the result of search. When a file is acquired and recorded by file acquisition processing on the basis of the result of search, the program proceeds to the step 41.

The answer is in the negative in the step 41, after which the program proceeds to the step 44. In the step 44, a list of one link destination (a-1-1.html) included in the URL (a-1.html) of the file most newly acquired is prepared, after which the program proceeds to the step 45. A range in which link destinations existing in a file are searched for is one in which hierarchies including the link destinations are the first and second hierarchies from a hierarchy including the file. Therefore, in the step 45, the link destination (a-1-1.html) in the third hierarchy is not retrieved. Consequently, the program proceeds to the step 47.

In the step 47, a list including a URL of a file most newly acquired is read. That is, the list (a-1.html, a-2.html) including the URL (a-1.html) of the file most newly acquired is read. The URL which has not been searched for yet and is in the designated range is retrieved from the read list (step 48). That is, the URL (a-2.html) is retrieved. Consequently, the program proceeds to the step 49 from the step 48. In the step 49, the retrieved link destination (a-2.html) is taken as the result of search. When a file is acquired and recorded by file acquisition processing on the basis of the result of search, the program proceeds to the step 41.

The answer is in the negative in the step 41, after which the program proceeds to the step 44. In the step 44, a list of two link destinations (a-2-1.html, a-2-2.html) included in the URL (a-2.html) of the file most newly acquired is prepared, after which the program proceeds to the step 45. A range in which link destinations existing in a file are searched for is one in which hierarchies including the link destinations are the first and second hierarchies from a hierarchy including the file. Therefore, in the step 45, neither one of the link destinations (a-2-1.html, a-2-2.html) in the third hierarchy is retrieved. Consequently, the program proceeds to the step 47.

In the step 47, the list (a-1.html, a-2.html) including the URL (a-2.html) of the file most newly acquired is read. The URL which has not been searched for yet and is in the designated range is retrieved from the read list (step 48). In this case, both the URLs (a-1.html, a-2.html) have been already retrieved, whereby the program proceeds to the step 50.

In the step 50, if there exists a list including the URLs of the files which are the origin of the production of the read list, the list is read, after which the program is returned to the step 48. In this example, there exists the list (a.html, b.html) which is the origin of the preparation of the read list (a-1.html, a-2.html). Therefore, the list (a.html, b.html) is read, after which the program is returned to the step 48.

In the step 48, the URL which has not been searched for yet and is in the designated range is retrieved from the read list (a.html, b.html) (step 48). In this case, the URL (a.html) has been already retrieved, while the URL (b.html) has not been retrieved yet. Therefore, the URL (b.html) is retrieved. Consequently, the program proceeds to the step 49 from the step 48. In the step 49, the retrieved URL (b.html) is taken as the result of search. If a file is acquired and recorded by file acquisition processing, the program proceeds to the step 41.

In the step 41, the answer is in the negative. In the step 44, a list of two link destinations (b-1.gif, a.html) included in the URL (b.html) of the file most newly acquired is prepared. In the step 45, the link destination (b-1.gif) is retrieved. Consequently, the program proceeds to the step 46 from the step 45. In the step 46, the retrieved ink destination (b-1.gif) is taken as the result of search. If a file is acquired and recorded by file acquisition processing on the basis of the result of search, the program proceeds to the step 41.

The answer is in the negative in the step 41, after which the program proceeds to the step 44. In the step 44, no link destination is included in the URL (b-1.gif) of the file most newly acquired. Therefore, a blank list is prepared in the step 44. Consequently, in the step 45, no link destination is retrieved, after which the program proceeds to the step 47. In the step 47, the list (b-1.gif, a.html) including the URL (b-1.gif) of the file most newly acquired is read. Since both the URLs (b-1.gif, a.html) included in the read list have been already retrieved, the program proceeds to the step 50 from the step 48.

In the step 50, there exists a list (a.html, b.html) which is the origin of the production of the read list (b-1.gif, a.html). Therefore, the list (a.html, b.html) is read, after which the program is returned to the step 48.

Since both of the URLs (a.html, b.html) included in the read list have been already retrieved, the program proceeds to the step 50 from the step 48. In the step 50, there exists the list (A index.html, B index.html, C index.html) which is the origin of the production of the read list (a.html, b.html). Therefore, the list (A index.html, B index.html, C index.html) is read, after which the program is returned to the step 48.

In the step 48, the URL (B index.html) which has not been searched for yet and is in the designated range is retrieved from the read list. Consequently, the program proceeds to the step 49 from the step 48. In the step 49, the retrieved URL (B index.html) is taken as the result of search. When a file is acquired and recorded by file acquisition processing on the basis of the result of search, the program proceeds to the step 41.

The answer is in the negative in the step 41, after which the program proceeds to the step 44. Since no link destination is included in the URL (B index.html) of the file most newly acquired, a blank list is prepared in the step 44. Therefore, in the step 45, no link destination is retrieved, after which the program proceeds to the step 47. In the step 47, the list (A index.html, B index.html, C index.html) including the URL (B index.html) of the file most newly acquired is read. The program then proceeds to the step 48.

In the step 48, the URL (C index.html) which has not been searched for yet and is in the designated range is retrieved from the read list. Consequently, the program proceeds to the step 49 from the step 48. In the step 49, the retrieved URL (C index.html) is taken as the result of search. When a file is acquired and recorded by file acquisition processing on the basis of the result of search, the program proceeds to the step 41.

The answer is in the negative in the step 41. In the step 44, a list of two link destinations (c.html, d.html) included in the URL (C index.html) of the file most newly acquired is prepared. In the step 45, the link destination (c.html) is retrieved. Consequently, the program proceeds to the step 46 from the step 45. In the step 46, the retrieved link destination (c.html) is taken as the result of search. When a file is acquired and recorded by file acquisition processing on the basis of the result of search, the program proceeds to the step 41.

The answer is in the negative in the step 41, after which the program proceeds to the step 44. No link destination is included in the URL (c.html) of the file most newly acquired. Therefore, a blank list is prepared in the step 44. Consequently, in the step 45, no link destination is retrieved, after which the program proceeds to the step 47. In the step 47, the list (c.html, d.html) including the URL (c.html) of the file most newly acquired is read. The program then proceeds to the step 48.

In the step 48, the URL (d.html) which has not been searched for yet and is in the designated range is retrieved from the read list. Consequently, the program proceeds to the step 49 from the step 48. In the step 49, the retrieved URL (d.html) is taken as the result of search. When a file is acquired and recorded by file acquisition processing on the basis of the result of search, the program proceeds to the step 41.

The answer is in the negative in the step 41, after which the program proceeds to the step 44. Since no link destination is included in the URL (d.html) of the file most newly acquired, a blank list is prepared in the step 44. Therefore, no link destination is retrieved in the step 45, after which the program proceeds to the step 47. In the step 47, the list (c.html, d.html) including the URL (d.html) of the file most newly acquired is read. The program then proceeds to the step 48.

Since both of the URLs (c.html, d.html) included in the read list have been already searched for, the program proceeds to the step 50 from the step 48. In the step 50, there exists the list (A index.html, B index.html, C index.html) which is the origin of the production of the read list (c.html, d.html). Therefore, the list (A index.html, B index.html, C index.html) is read, after which the program is returned to the step 48.

Since the URLs (A index.html, B index.html, C index.html) included in the read list have been already retrieved, the program proceeds to the step 50 from the step 48. There exists no list which is the origin of the production of the read list (A index.html, B index.html, C index.html), whereby the program proceeds to the step 51 from the step 50. In the step 51, the fact that there exists no object to be retrieved is taken as the result of search. Consequently, in this case, the answer is in the negative in the step 23 shown in FIG. 6, whereby the current reserved recording processing is terminated.

The reserved recording processing may be terminated when the remaining capacity of the hard disk is not more than a predetermined capacity.

(3) Description of Reading And Retrieving Function

When it is desired to read a file recorded in the hard disk 14, the retrieving button 34 is depressed from the main window shown in FIG. 2, to open a window for reading. Since a list of URLs of files and the like recorded in the hard disk 14 is displayed on the window for reading, the URL of the file to be read may be designated by double click or the like.

In order to retrieve the desired file out of the files recorded in the hard disk 14, the retrieving button 34 is depressed from the main window shown in FIG. 2, to open the window for reading. A keyword for retrieval may be entered upon opening a window for retrieval from the window for reading.

Figure 10:
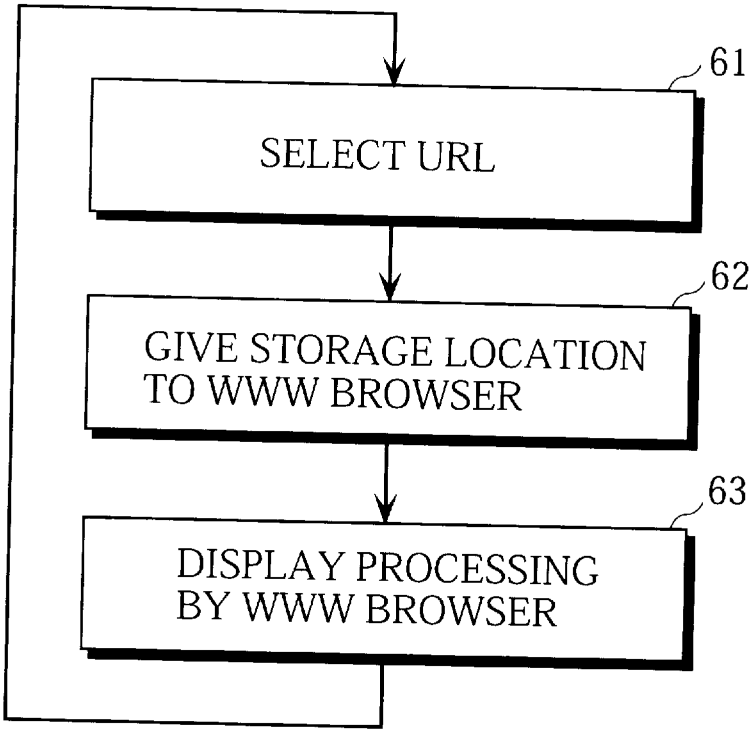
FIG. 10 is a flow chart showing the procedure for processing performed when a file is selected in a state where a window for reading is opened.

FIG. 10 shows the procedure for processing performed when a URL is selected in a state where the window for reading is opened.

When one URL is selected by double click or the like from the list of URLs displayed in the window for reading (step 61), data representing the storage location of a file corresponding to the URL is given to the WWW browser (step 62). Display processing is performed by the WWW browser (step 63). That is, the WWW browser reads out the file and displays the file read out on the display 11 on the basis of the received data. Further, when an anchor of a link included in the displayed file is clicked, the WWW browser reads out a file at a link destination from the hard disk 14 and displays the file read out.

Figure 11:
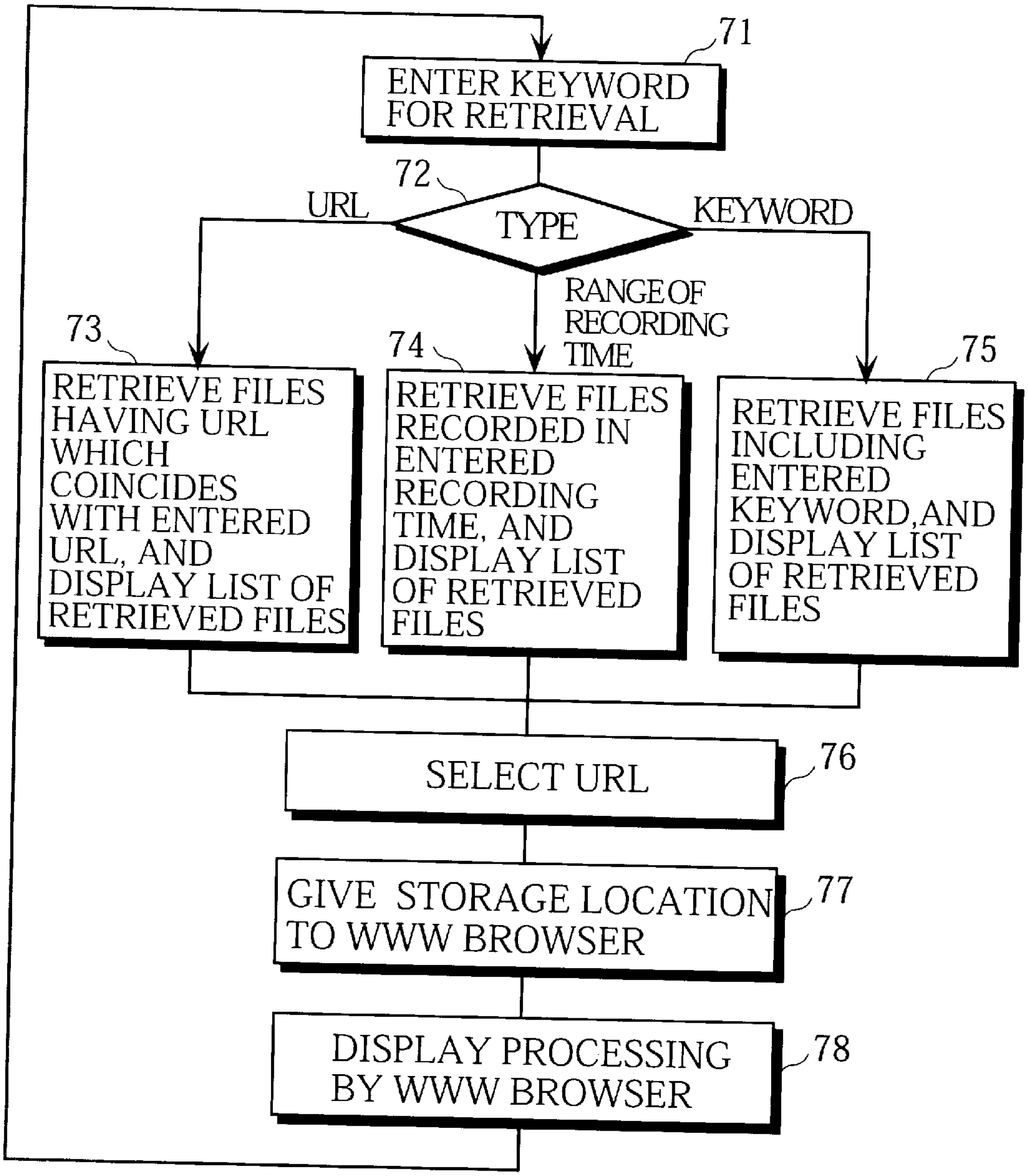
FIG. 11 is a flow chart showing the procedure for processing performed when a keyword for retrieval is entered in a state where a window for retrieval is opened.

FIG. 11 shows the procedure for processing performed when a keyword for retrieval is entered in a state where the window for retrieval is opened.

When the keyword for retrieval is entered from the window for retrieval (step 71), processing corresponding to the type of the entered keyword for retrieval is performed. Examples of the type of the keyword for retrieval to be entered include a URL, the range of the recording time, and a word (a keyword) included in a file.

When the URL is entered as the keyword for retrieval, the program proceeds to the step 73 from the step 72. In the step 73, files having a URL which coincides with the entered URL are retrieved, and only a list of the retrieved files is displayed.

When the range of the recording time (the date and the time) is entered as the keyword for retrieval, the program proceeds to the step 74 from the step 72. In the step 74, files recorded in the entered range of the recording time are retrieved, and only a list of the retrieved files is displayed.

When the word (the keyword) included in the file is entered as the keyword for retrieval, the program proceeds to the step 75 from the step 72. In the step 75, files including data which coincides with the entered keyword are retrieved, and only a list of the retrieved files is displayed.

In the foregoing steps 73, 74 and 75, when one URL is selected by double click or the like in a state where the list of the retrieved files is displayed (step 76), data representing the storage location of a file corresponding to the URL is given to the WWW browser (step 77). Display processing is performed by the WWW browser (step 78). That is, the WWW browser reads out the file and displays the file read out on the display 11 on the basis of the received data. Further, when an anchor of a link included in the displayed file is clicked, the WWW browser reads out a file at a link destination from the hard disk 14 and displays the file read out.

(4) Description of Map Preparing Function

Files recorded in the hard disk 14 are related to each other by a link. The map preparing function is for preparing a map (a link map) representing a link relationship among the files recorded in the hard disk 14.

When it is desired to prepare the link map, the map preparing button 31 may be depressed from the main window shown in FIG. 2.

Figure 12:
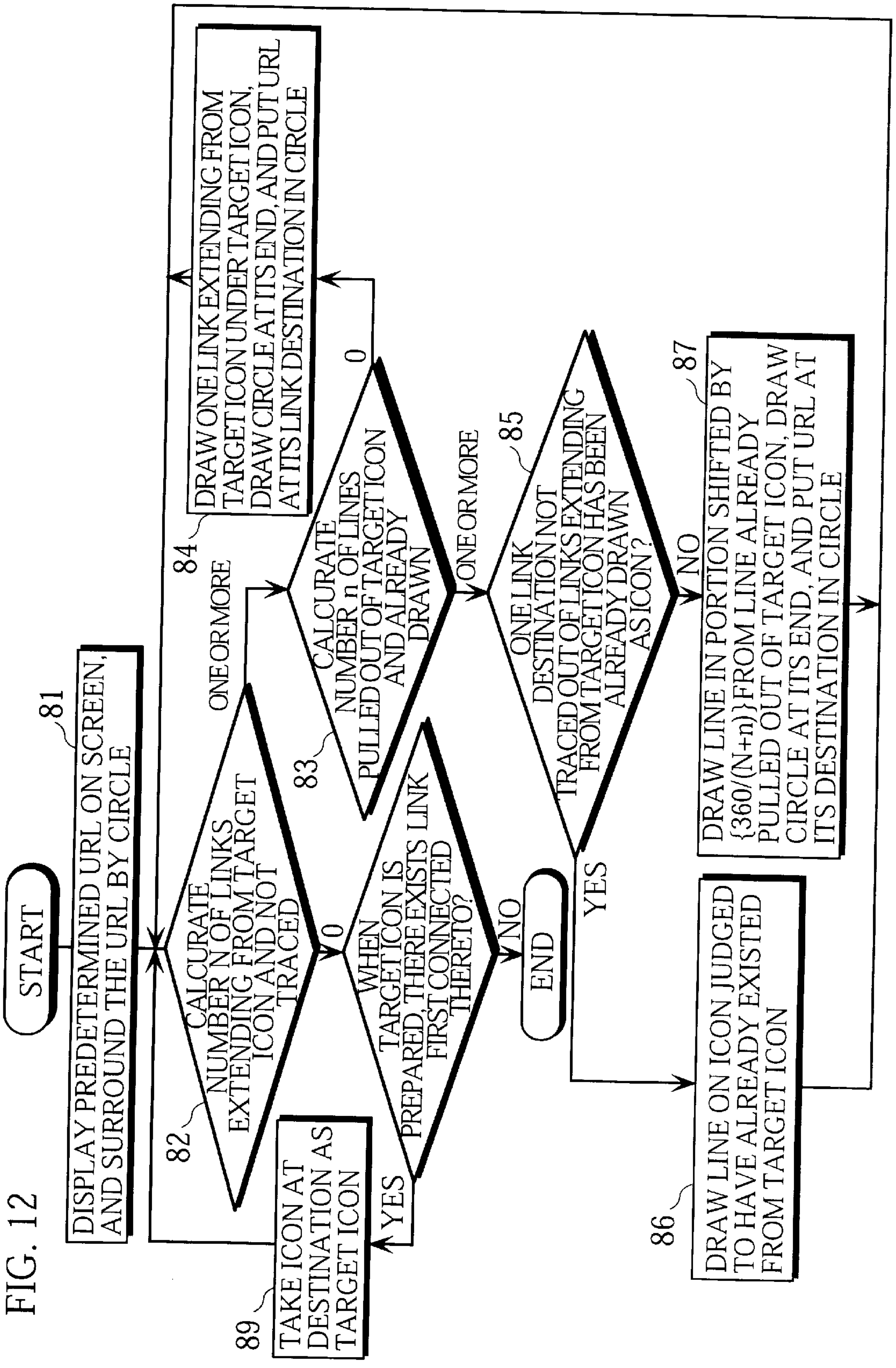
FIG. 12 is a flow chart showing the procedure for map preparation processing.

FIG. 12 shows the procedure for the map preparing function.

Figure 13:
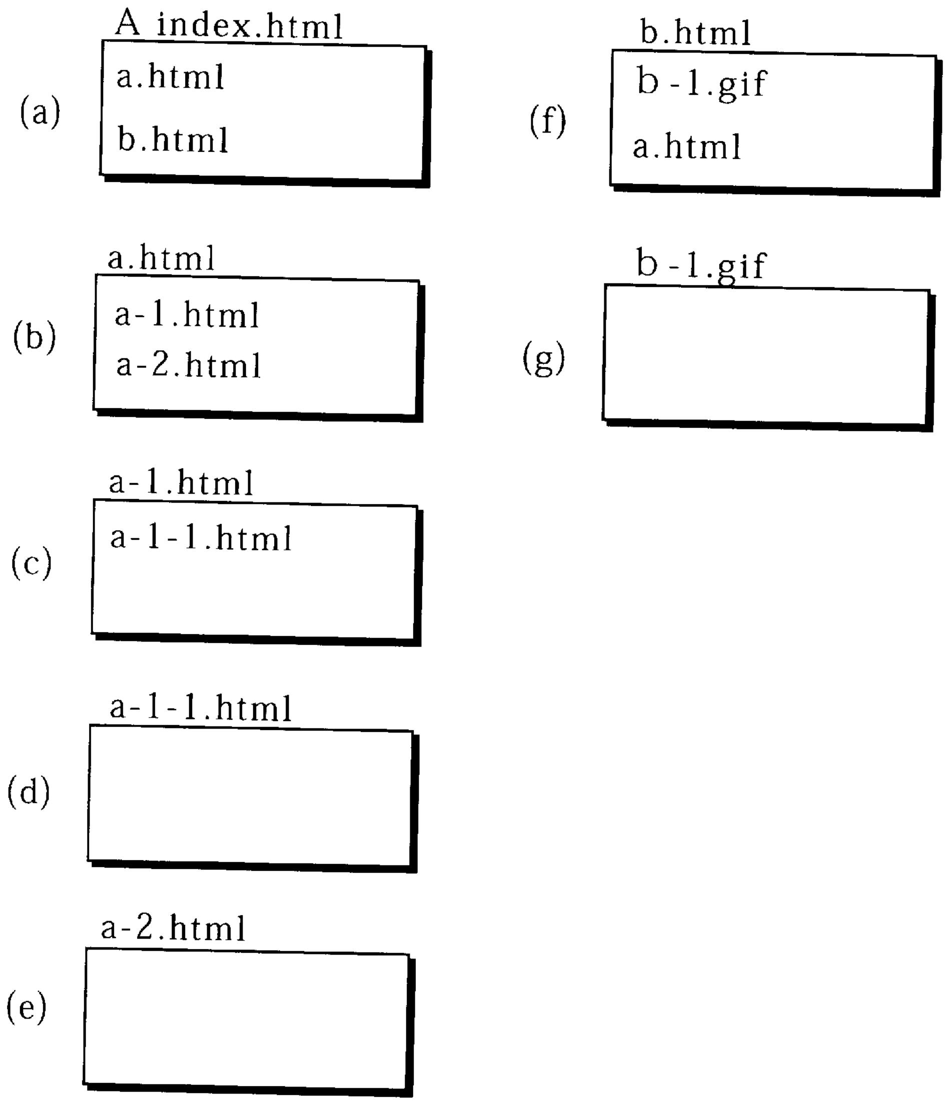
FIG. 13 is a typical view showing a link relationship among recorded files.
Figure 14:
FIG. 14 is an illustration for explaining map preparation processing.

First, a predetermined URL is displayed on a screen, and the URL is surrounded by a circle (step 81). A file having a link relationship as shown in FIG. 13 shall be recorded in the hard disk 14. In the step 81, it is assumed that a URL (A index.html) shown in FIG. 13 is displayed on a screen, and the URL is surrounded by a circle. The URL (A index.html) surrounded by the circle is taken as a target icon [1].

The number N of links (virtual links) which extend from the target icon [1] {the URL (A index.html)} and have not been traced is calculated (step 82). As can be seen from FIG. 13, two links extend from the URL (A index.html). However, both the links have not been traced yet. Therefore, the result of the calculation N in the step 82 becomes two. Since the result of the calculation N is not less than one, the program proceeds to the step 83.

In the step 83, the number n of lines which have been already pulled out of the target icon [1] and have been already drawn is calculated. Since the number n of lines which have been already pulled out of the target icon [1] and have been already drawn is zero, the program proceeds to the step 84.

Figure 15:
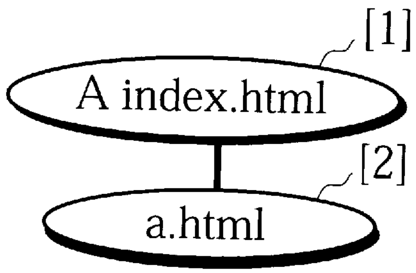
FIG. 15 is an illustration for explaining map preparation processing.

In the step 84, one of the links extending from the target icon [1] {the URL (A index.html)} is drawn under the target icon [1], a circle is drawn at its end, and a URL at its link destination (a.html) is put in the circle, as shown in FIG. 15. The prepared icon is taken as a target icon [2]. The program is then returned to the step 82.

In the step 82, the number N of links (virtual links) which extend from the target icon [2] {the URL (a.html)} and have not been traced is calculated. As can be seen from FIG. 13, two links extend from the URL (a.html). However, both the links have not been traced yet. Therefore, the result of the calculation N in the step 82 becomes two. Since the result of the calculation N is not less than one, the program proceeds to the step 83.

In the step 83, the number n of lines which have been already pulled out of the target icon [2] and have been already drawn is calculated. Since the number n of lines which have been already pulled out of the target icon [2] and have been already drawn is one, the program proceeds to the step 85.

In the step 85, it is judged whether or not one link destination (a-1.html) which has not been traced yet out of the links extending from the target icon [2] {the URL (a.html)} has been already drawn as an icon. Since the link destination (a-1.html) has not been drawn as an icon yet, the program proceeds to the step 87.

Figure 16:
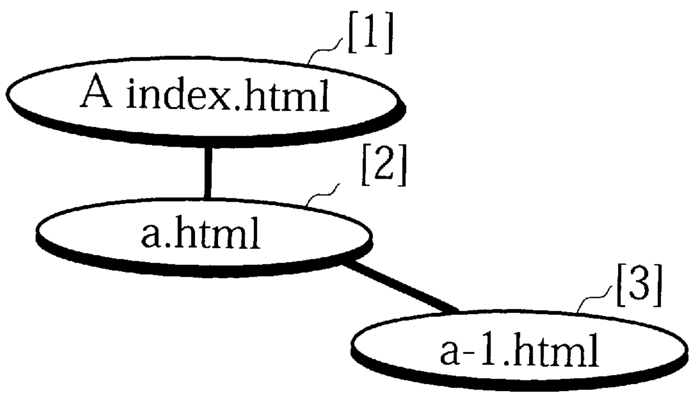
FIG. 16 is an illustration for explaining map preparation processing.

In the step 87, a line is drawn in a portion shifted by {360/(N+n)} from the line already pulled out of the target icon [2], a circle is drawn at its end, and a URL at its link destination (a-1.html) is put in the circle, as shown in FIG. 16. The prepared icon is taken as a target icon [3]. The program is then returned to the step 82.

In the step 82, the number N of links (virtual links) which extend from the target icon [3] {the URL (a-l.html)} and have not been traced is calculated. As can be seen from FIG. 13, one link extends from the URL (a-1.html). However, the link has not been traced yet. Therefore, the result of the calculation N in the step 82 becomes one. Since the result of the calculation N becomes one, the program proceeds to the step 83.

In the step 83, the number n of lines which have been already pulled out of the target icon [3] and have been already drawn is calculated. Since the number n of lines which have been already pulled out of the target icon [3] and have been already drawn is one, the program proceeds to the step 85.

In the step 85, it is judged whether or not one link destination (a-1-1.html) which has not been traced yet out of links extending from the target icon [3] {the URL (al.html)} has been already drawn as an icon. Since the link destination (a-1-1.html) has not been drawn as an icon yet, the program proceeds to the step 87.

Figure 17:
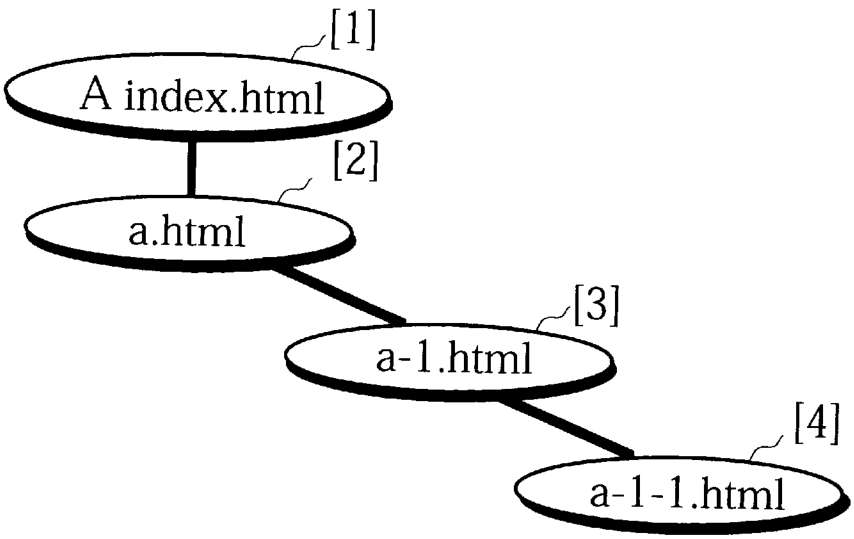
FIG. 17 is an illustration for explaining map preparation processing.

In the step 87, a line is drawn in a portion shifted by {360/(N+n)} from the line already pulled out of the target icon [3], a circle is drawn at its end, and a URL at its link destination (a-1-1.html) is put in the circle, as shown in FIG. 17. The prepared icon is taken as a target icon [4]. The program is then returned to the step 82.

In the step 82, the number N of links (virtual links) which extend from the target icon [4] {the URL (a-1-1.html)} and have not been traced is calculated. As can be seen from FIG. 13, no link extends from the URL (a-1-1.html). Therefore, the result of the calculation N in the step 82 becomes zero. Since the result of the calculation N is zero, the program proceeds to the step 88.

In the step 88, when the target icon [4] is prepared, it is judged whether or not there exists a link first connected thereto. In this example, there exists a link first connected to the target icon [4], whereby the program proceeds to the step 89.

In the step 89, the link first connected to the target icon [4] is traced, and an icon [3] at its destination is taken as a target icon. The program is then returned to the step 82.

In the step 82, the number N of links (virtual links) which extend from the target icon [3] {the URL (a-l.html)} and have not been traced is calculated. As can been seen from FIG. 13, one link extends from the URL (a-1.html). However, the link has been already traced. Therefore, the result of the calculation N in the step 82 becomes zero. Since the result of the calculation N is zero, the program proceeds to the step 88.

In the step 88, when the target icon [3] is prepared, it is judged whether or not there exists a link first connected thereto. In this example, there exists a link first connected to the target icon [3], whereby the program proceeds to the step 89.

In the step 89, the link first connected to the target icon [3] is traced, and an icon [2] at its destination is taken as a target icon. The program is then returned to the step 82.

In the step 82, the number N of links (virtual links) which extend from the target icon [2] {the URL (a.html)} and have not been traced is calculated. As can be seen from FIG. 13, two links extend from the URL (a.html). However, one of them has been already traced. Therefore, the result of the calculation N in the step 82 becomes one. Since the result of the calculation N is not less than one, the program proceeds to the step 83.

In the step 83, the number n of lines which have been already pulled out of the target icon [2] and have been already drawn is calculated. Since the number n of lines which have been already pulled out of the target icon [2] and have been already drawn is two, the program proceeds to the step 85.

In the step 85, it is judged whether or not one link destination (a-2.html) which has not been traced yet out of links extending from the target icon [2] {the URL (a.html)} has been already drawn as an icon. Since the link destination (a-2.html) has not been drawn as an icon yet, the program proceeds to the step 87.

Figure 18:
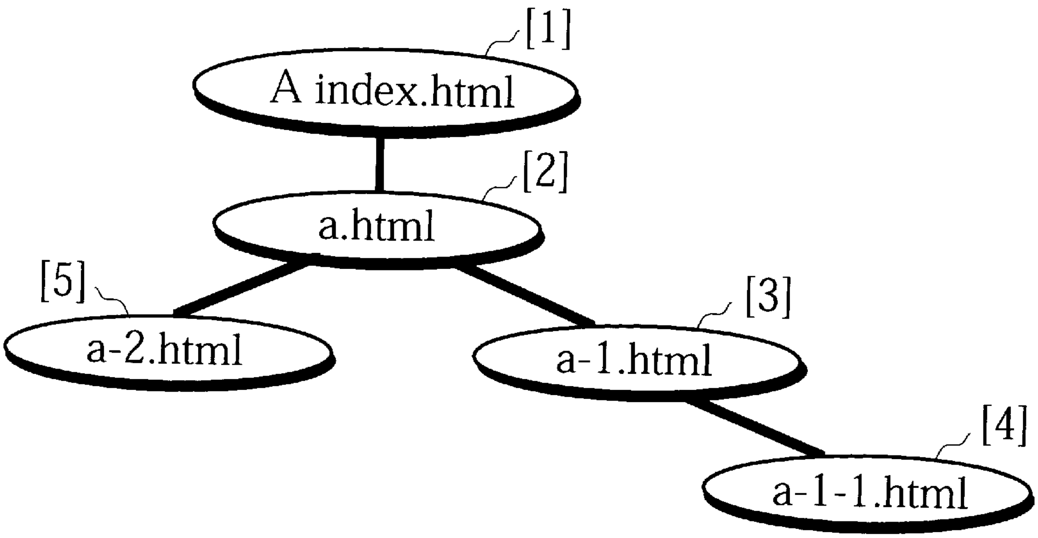
FIG. 18 is an illustration for explaining map preparation processing.

In the step 87, a line is drawn in a portion shifted by {360/(N+n)} from the line already pulled out of the target icon [2], a circle is drawn at its end, and a URL at its link destination (a-2.html) is put in the circle, as shown in FIG. 18. The prepared icon is taken as a target icon [5]. The program is then returned to the step 82.

In the step 82, the number N of links (virtual links) which extend from the target icon [5] {the URL (a-2.html)} and have not been traced is calculated. As can be seen from FIG. 13, no link extends from the URL (a-2.html). Therefore, the result of the calculation N in the step 82 becomes zero. Since the result of the calculation N is zero, the program proceeds to the step 88.

In the step 88, when the target icon [5] is prepared, it is judged whether or not there exists a link first connected thereto. In this example, there exists a link first connected to the target icon [5], whereby the program proceeds to the step 89.

In the step 89, the link first connected to the target icon [5] is traced, and an icon [2] at its destination is taken as a target icon. The program is then returned to the step 82.

In the step 82, the number N of links (virtual links) which extend from the target icon [2] (the URL (a.html)} and have not been traced is calculated. As can be seen from FIG. 13, two links extend from the URL (a.html). However, both the links have been traced. Therefore, the result of the calculation N in the step 82 becomes zero. Since the result of the calculation N is zero, the program proceeds to the step 88.

In the step 88, when the target icon [2] is prepared, it is judged whether or not there exists a link first connected thereto. In this example, there exists a link first connected to the target icon [2], whereby the program proceeds to the step 89.

In the step 89, the link first connected to the target icon [2] is traced, and an icon [1] at its destination is taken as a target icon. The program is then returned to the step 82.

In the step 82, the number N of links (virtual links) which extend from the target icon [1] {the URL (A index.html)} and have not been traced is calculated. As can be seen from FIG. 13, two links extend from the URL (A index.html). However, one of them has been traced. Therefore, the result of the calculation N in the step 82 becomes one. Since the result of the calculation N is not less than one, the program proceeds to the step 83.

In the step 83, the number n of lines which have been already pulled out of the target icon [1] and have been already drawn is calculated. Since the number n of lines which have been already pulled out of the target icon [1] and have been already drawn is one, the program proceeds to the step 85.

In the step 85, it is judged whether or not one link destination (b.html) which has not been traced yet out of links extending from the target icon [1] {the URL (A index.html)} has been already drawn as an icon. Since the link destination (b.html) has not been drawn as an icon yet, the program proceeds to the step 87.

Figure 19:
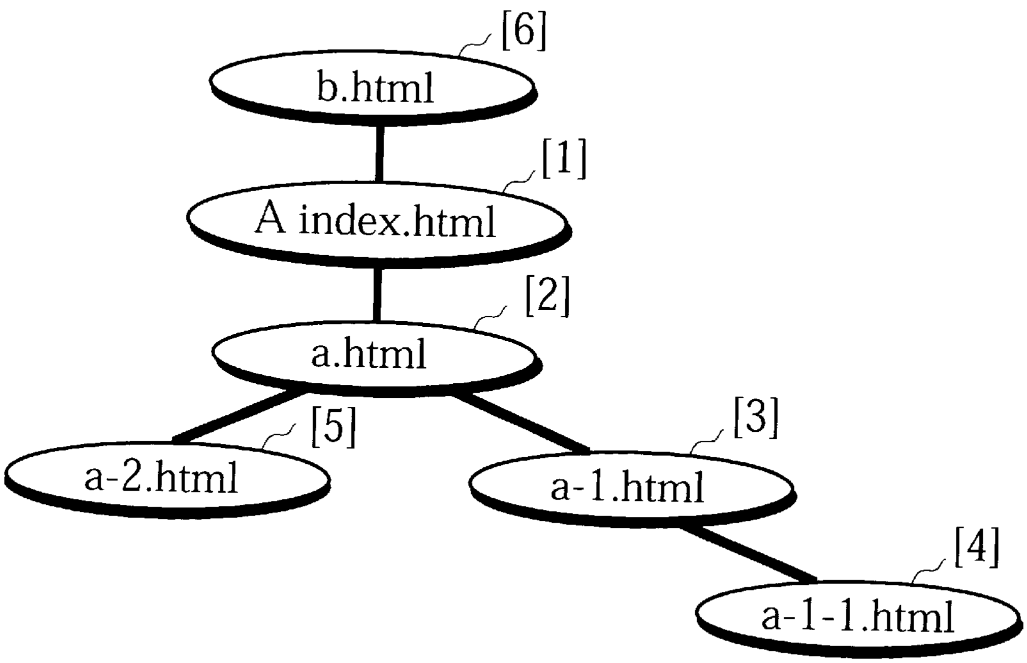
FIG. 19 is an illustration for explaining map preparation processing.

In the step 87, a line is drawn in a portion shifted by {360/(N+n)} from the line already pulled out of the target icon [1], a circle is drawn at its end, and a URL at its link destination (b.html) is put in the circle, as shown in FIG. 19. The prepared icon is taken as a target icon [6]. The program is then returned to the step 82.

In the step 82, the number N of links (virtual links) which extend from the target icon [6] {the URL (b.html)} and have not been traced is calculated. As can be seen from FIG. 13, two links extend from the URL (b.html). However, both the links have not been traced yet. Therefore, the result of the calculation N in the step 82 becomes two. Since the result of the calculation N is not less than one, the program proceeds to the step 83.

In the step 83, the number n of lines which have been already pulled out of the target icon [6] and have been already drawn is calculated. Since the number n of lines which have been already pulled out of the target icon [6] and have been already drawn is one, the program proceeds to the step 85.

In the step 85, it is judged whether or not one link destination (b-1.gif) which has not been traced yet out of links extending from the target icon [6] {the URL (b.html)} has been already drawn as an icon. Since the link destination (b-1.gif) has not been drawn as an icon yet, the program proceeds to the step 87.

Figure 20:
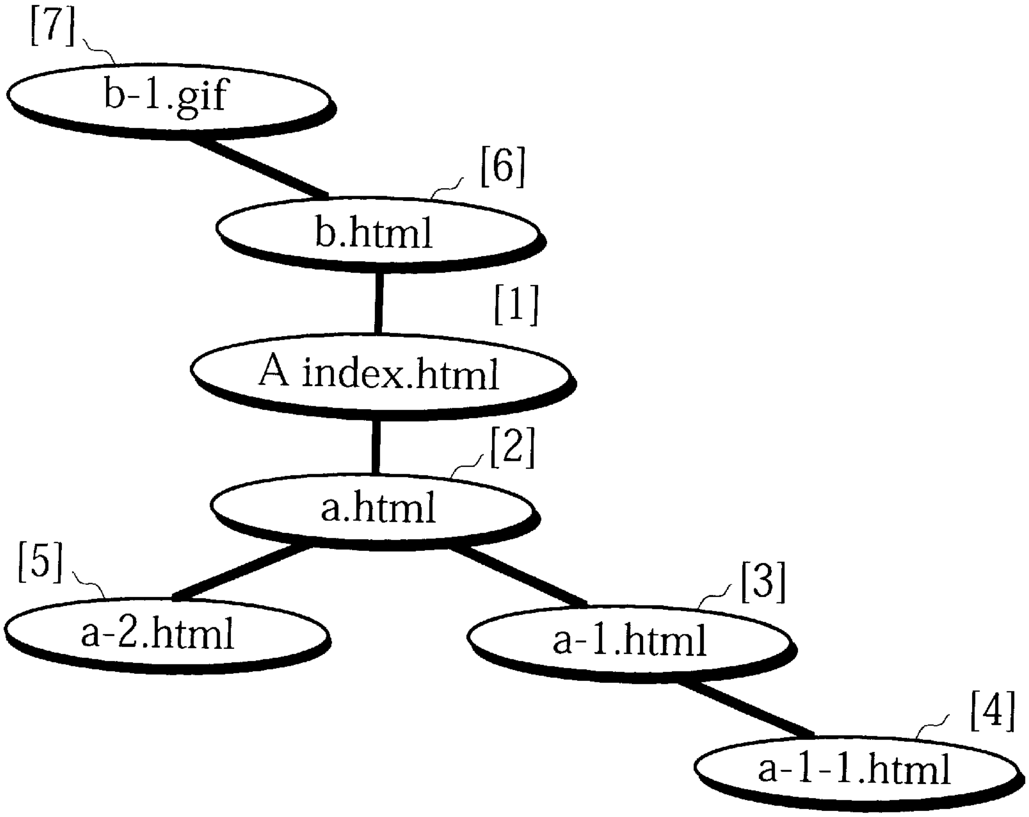
FIG. 20 is an illustration for explaining map preparation processing.

In the step 87, a line is drawn in a portion shifted by {360/(N+n)} from the line already pulled out of the target icon [6], a circle is drawn at its end, and a URL at its link destination (b-1.gif) is put in the circle, as shown in FIG. 20. The prepared icon is taken as a target icon [7]. The program is then returned to the step 82.

In the step 82, the number N of links (virtual links) which extend from the target icon [7] {the URL (b-1.gif)} and have not been traced is calculated. As can be seen from FIG. 13, no link extends from the URL (b-1.gif). Therefore, the result of the calculation N in the step 82 becomes zero. Since the result of the calculation N is zero, the program proceeds to the step 88.

In the step 88, when the target icon [7] is prepared, it is judged whether or not there exists a link first connected thereto. In this example, there exists a link first connected to the target icon [7], whereby the program proceeds to the step 89.

In the step 89, the link first connected to the target icon [7] is traced, and an icon [6] at its destination is taken as a target icon. The program is then returned to the step 82.

In the step 82, the number N of links (virtual links) which extend from the target icon [6] {the URL (b.html)} and have not been traced is calculated. As can be seen from FIG. 13, two links extend from the URL (b.html). However, one of them has been already traced. Therefore, the result of the calculation N in the step 82 becomes one. Since the result of the calculation N is not less than one, the program proceeds to the step 83.

In the step 83, the number n of lines which have been already pulled out of the target icon [6] and have been already drawn is calculated. Since the number n of lines which have been already pulled out of the target icon [6] and have been already drawn is two, the program proceeds to the step 85.

In the step 85, it is judged whether or not one link destination (a.html) which has not been traced yet out of links extending from the target icon [6] {the URL (b.html)} has been already drawn as an icon. Since the link destination (b.html) has been already drawn as an icon, the program proceeds to the step 86.

Figure 21:
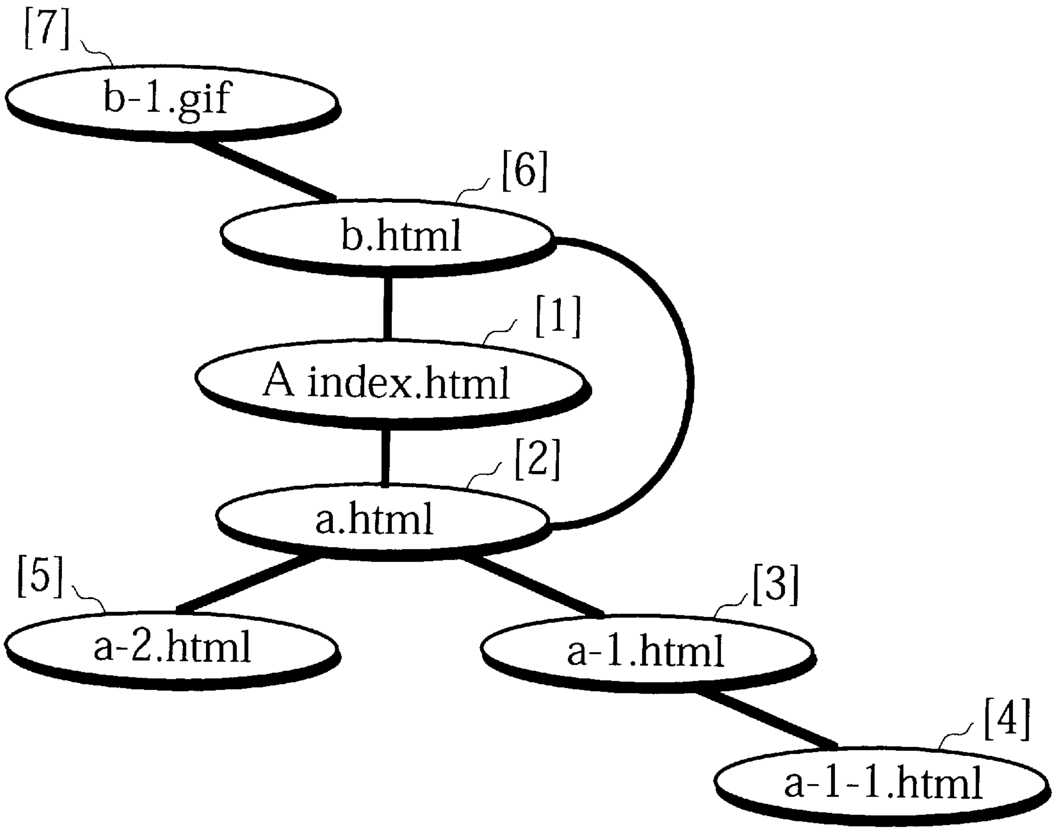
FIG. 21 is an illustration for explaining map preparation processing.

In the step 86, a line is drawn from the target icon [6] toward the icon [2] which is judged in the step 85 to have already existed, as shown in FIG. 21. The program is then returned to the step 82.

In the step 82, the number N of links (virtual links) which extend from the target icon [6] {the URL (b.html)} and have not been traced is calculated. As can be seen from FIG. 13, two links extend from the URL (b.html). However, both the links have been already traced. Therefore, the result of the calculation N in the step 82 becomes zero. Since the result of the calculation N is zero, the program proceeds to the step 88.

In the step 88, when the target icon [6] is prepared, it is judged whether or not there exists a link first connected thereto. In this example, there exists a link first connected to the target icon [6], whereby the program proceeds to the step 89.

In the step 89, the link first connected to the target icon [6] is traced, and an icon [1] at its destination is taken as a target icon. The program is then returned to the step 82.

In the step 82, the number of links (virtual links) which extend from the target icon [1] {the URL (A index.html)} and have not been traced is calculated. As can be seen from FIG. 13, two links extend from the URL (A index.html). However, both the links have been already traced. Therefore, the result of the calculation N in the step 82 becomes zero. Since the result of the calculation N is zero, the program proceeds to the step 88.

In the step 88, when the target icon [1] is prepared, it is judged whether or not there exists a link first connected thereto. In this example, there exists no link first connected to the target icon [1], whereby the processing is terminated.

The link relationship may be made more clearly understandable by changing the colors and the shapes of the icons or assigning signs to the icons.

(5) Function Achieved by Making WWW Server Prepare Predetermined File (5-1) Description Of Processing In A Case Where A List File Is Placed On A WWW Server A list file describing URLs of files included in a predetermined group (hereinafter referred to as URLs of files to be recorded) out of files provided by the WWW server 3 is previously prepared, and is placed in a predetermined location on the WWW server 3. The WWW client 1 down-loads the list file from the WWW server 3, and automatically down-loads files corresponding to all or parts of the URLs of the files to be recorded which are included in the list file and records the files on a hard disk. A list file describing URLs of files in a predetermined group (hereinafter referred to as URLs of files to be recorded) selected out of all files provided by all WWW servers on the network may be placed on the predetermined WWW server. The list file is prepared by HTML, SGML or the like.

It is preferable that a sublist file describing URLs of all files included in a predetermined group and a main list file describing the names and the simple contents of some groups of sublist files are prepared as the list file. The main list file is placed under a particular name in the same place as index.html. Various types of recording reservations are possible by preparing the sublist files having various structures on the server side, whereby a group of files included in the sublist file actually designated by making recording can be recorded in the hard disk on the client side.

Specifically, the main list file is first acquired and recorded. The recording of a predetermined sublist file is reserved from the recorded main list file. When the set recording start time has come, the sublist file whose recording is reserved is down-loaded, and a file corresponding to each of URLs included in the sublist file is down-loaded while holding a link relationship and is recorded in the hard disk.

Figure 22:
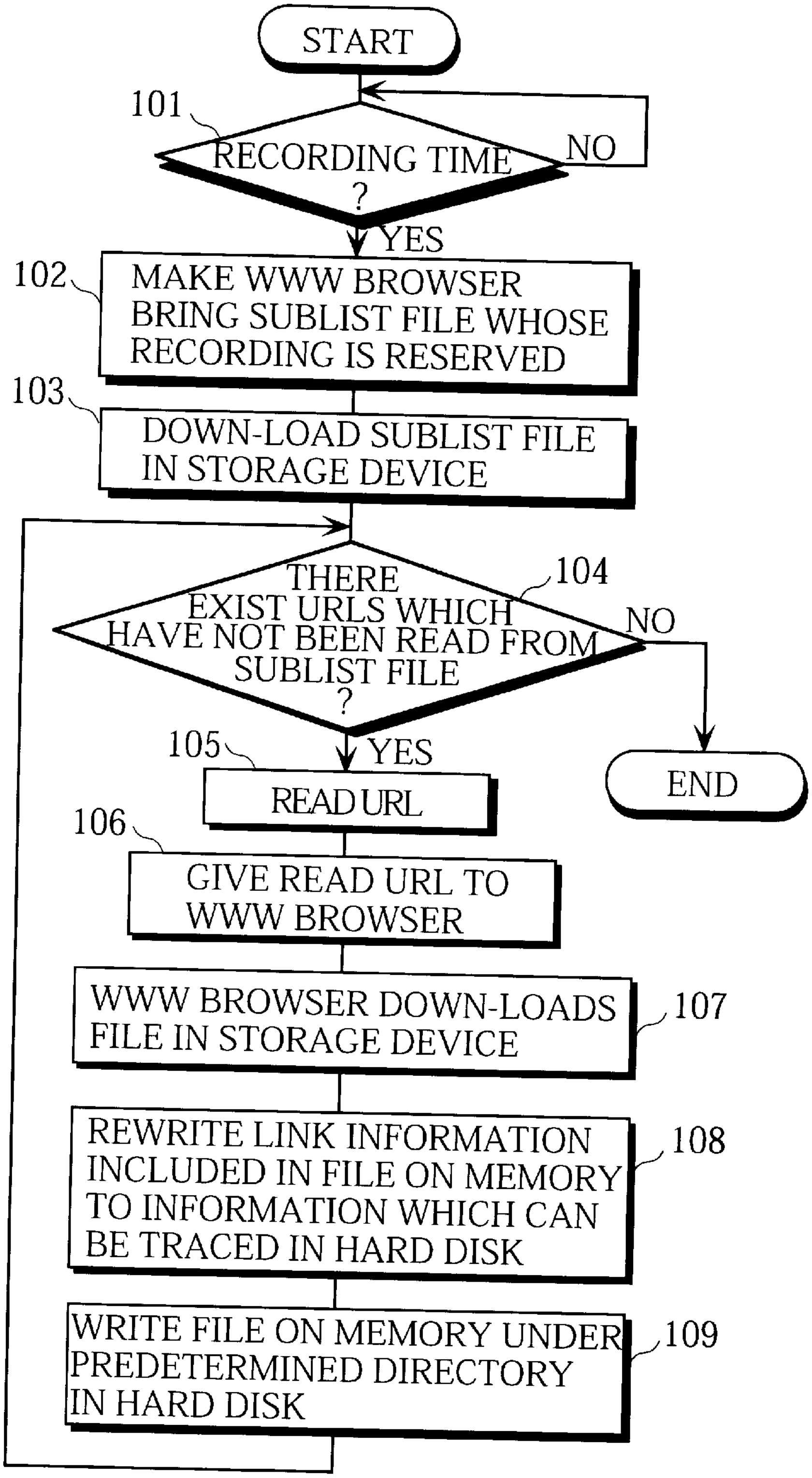
FIG. 22 is a flow chart showing the procedure for processing performed when the recording of a predetermined sublist file is reserved, and the recording start time has come.

FIG. 22 shows the procedure for processing performed when the recording of a predetermined sublist file is reserved, and the recording start time has come.

When the recording start time has come (step 101), the WWW browser is made to bring the sublist file whose recording is reserved from the WWW server 3 (step 102). The acquired sublist file is down-loaded in the storage device (step 103).

When there exist URLs which have not been read yet in the step 105 out of URLs (URLs of files to be recorded) existing in the acquired sublist file (YES in step 104), one of the URLs of the files to be recorded which have not been read is selected and is read (step 105). The read URL of the file to be recorded is given to the WWW browser (step 106). Consequently, the WWW browser acquires a file corresponding to the URL of the file to be recorded from the WWW server 3, and down-loads the file in the storage device (step 107).

Link information included in the down-loaded file is left as a comment in the file, and the link information included in the file, which represents the position of a file at a link destination placed on the side of the WWW server 3 on the internet, is rewritten to information representing the position where the file at the link destination is stored in the hard disk 14 on the side of the WWW client 1 (step 108), after which the file is written under a directory corresponding to the URL in the hard disk 14 (step 109). The program is then returned to the step 104.

When the processing in the steps 104 to 109 is thus repeated, and all files corresponding to the URLs of the files to be recorded which are included in the acquired sublist file are stored in the hard disk, the answer is in the negative in the step 104, whereby the processing is terminated.

When immediate recording is made, the processing in the foregoing steps 102 to 109 is performed when the sublist file is designated.

It is preferable that coordinate data of a place to be clicked is described in a predetermined form in the existing HTML document with respect to a clickable map. When a particular program for realizing a moving picture or the like such as Java Applet is required, it is preferable that the program is included in the sublist file.

Furthermore, it is possible to also select collection of groups of files corresponding to the URLs of the files to be recorded which are put on the sublist file or compression of each of files, whereby the acquisition time can be reduced.

Only the sublist file is acquired and is recorded, and only a predetermined file out of the files to be recorded which are included in the sublist file is acquired by the WWW browser, whereby it is possible to record the file. Data representing the sizes of all files and data representing the sizes of the files included in the sublist file may be included in the sublist file. This will be an element for judgment in selecting the file to be recorded from the sublist file.

Figure 23:
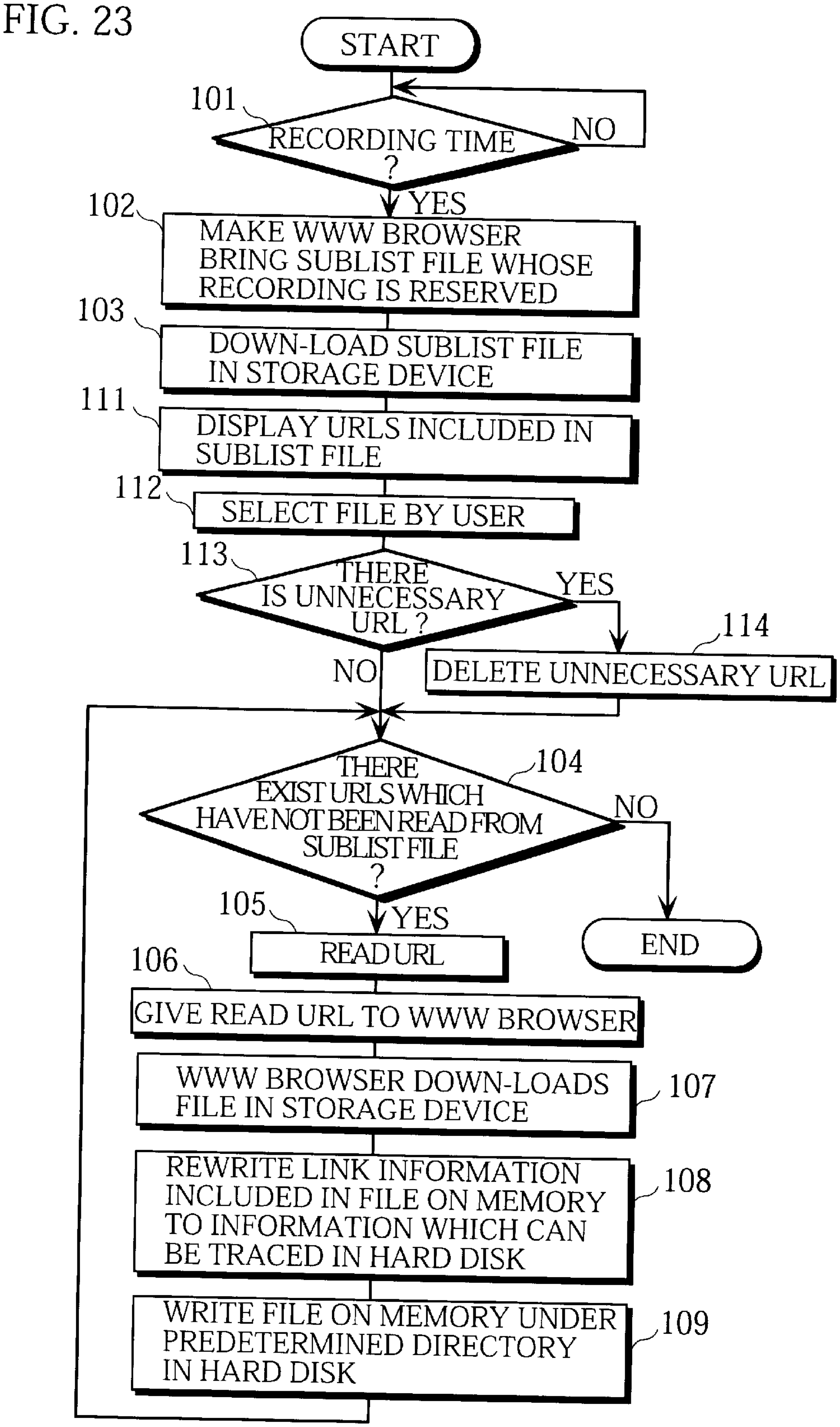
FIG. 23 is a flow chart showing another example of processing performed when the recording of a predetermined sublist file is reserved, and the recording start time has come.

FIG. 23 shows another example of processing performed when the recording of a predetermined sublist file is reserved, and the recording start time has come. In FIG. 23, the steps in which the same processing as that in the steps shown in FIG. 22 is performed are assigned the same numbers.

When the set recording start time has come (step 101), the WWW browser is made to bring the sublist file whose recording is reserved from the WWW server 3 (step 102). The acquired sublist file is down-loaded in the storage device(step 103).

URLs included in the acquired sublist file are displayed (step 111). File selection processing is performed by a user (step 112). That is, the user designates a URL of a file whose recording is considered unnecessary out of the displayed URLs.

When there exists the URL of the file designated by the user as one whose recording is considered unnecessary (YES in step 113), the URL of the file designated by the user as one whose recording is considered unnecessary is deleted from the down-loaded sublist file (step 114), after which the program proceeds to the step 104. When the URL of the file designated by the user as one whose recording is considered unnecessary does not exist (NO in step 113), the program proceeds to the step 104.

It is judged in the step 104 whether or not there exit the URLs which have not been read yet in the step 105 out of the URLs (the URLs of the files to be recorded) existing in the sublist file. When there exist the URLs of the files to be recorded which have not been read (YES in step 104), one of the URLs of the files to be recorded which have not been read is selected and is read (step 105). The read URL of the file to be recorded is given to the WWW browser (step 106). Consequently, the WWW browser acquires a file corresponding to the URL of the file to be recorded from the WWW server 3, and down-loads the file in the storage device (step 107).

Link information included in the down-loaded file is left as a comment in the file, and the link information included in the file, which represents the position of a file at a link destination placed on the side of the WWW server 3 on the internet, is rewritten to information representing the position where the file at the link destination is stored in the hard disk 14 on the side of the WWW client 1 (step 108), after which the file is written under a directory corresponding to the URL in the hard disk 14 (step 109). The program is then returned to the step 104.

When the processing in the steps 104 to 109 is thus repeated, and all files corresponding to the URLs of the files to be recorded which exist in the sublist file are stored in the hard disk, the answer is in the negative in the step 104, whereby the processing is terminated.

In the foregoing step 112, the URL of the file whose recording is considered necessary out of the displayed URLs may be designated by the user. In such a case, the files other than the file whose recording is considered necessary may be deleted by the user in the step 114.

When immediate recording is made, the processing in the foregoing step 102 and the subsequent steps is performed when the sublist file is designated.

(5-2) Description of Processing In A Case Where A Link File Is Placed On A WWW Server A link file describing a link relationship among all files on the WWW server 3 is placed on the WWW server 3. The link file is acquired by the WWW browser, and a map representing the link relationship is prepared and is displayed thereon on the basis of the acquired link file. Consequently, a map representing the link relationship among all the files on the predetermined WWW server 3 can be displayed before the files are obtained. A link file describing a link relationship among files in a predetermined group selected out of files provided by all WWW servers on the network may be placed on the WWW server irrespective of the files provided by the WWW server. The link file is prepared by HTML, for example.

Figure 24:
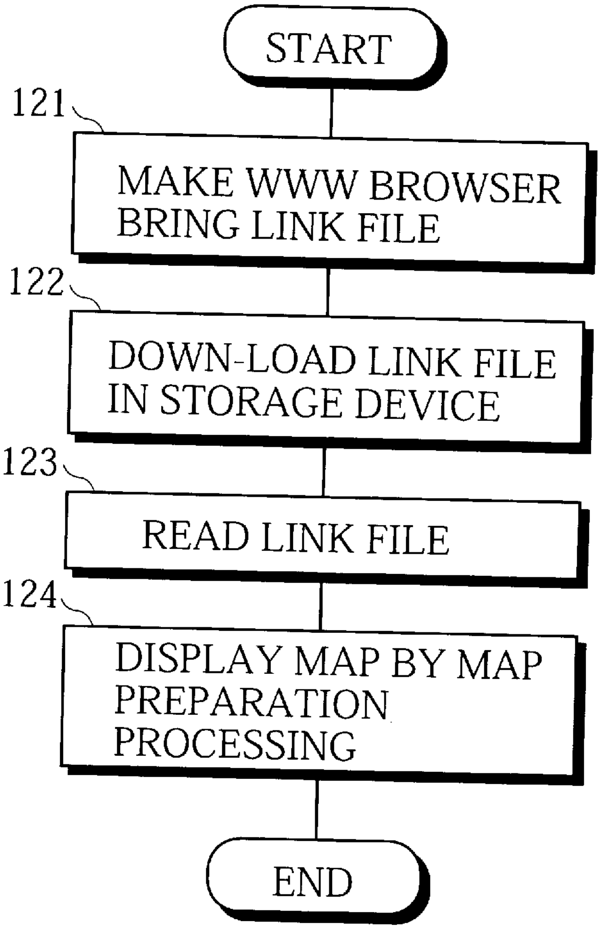
FIG. 24 is a flow chart showing the procedure for processing performed when a link file is acquired, and a map is displayed.

FIG. 24 shows the procedure for processing performed when a link file is acquired, and a map is displayed.

First, the WWW browser is made to bring a link file (step 121). The acquired link file is down-loaded in the storage device (step 122).

The acquired link file is read (step 123), and a map is prepared and is displayed by the same processing as the above-mentioned map preparation processing shown in FIG. 12 (step 124).

Image data which is a graphical representation of the structure of a hypertext type document may be placed on the WWW server 3, obtained and used as a clickable map.

(5-3) Description Of Processing In A Case Where A Site Map File (A Geometry File) Is Placed On A WWW Server A site map file describing URLs of files in a predetermined group (hereinafter referred to as URLs of files to be recorded) out of files provided by all WWW servers on the network and all or parts of link information included in the file indicated by each of the URLs of the files to be recorded is placed on the WWW server. That is, the site map file is a file obtained by integrating the above-mentioned list file with a link file.

The WWW server on which the site map file is placed may be a normal server or a dedicated server on which various site map files are placed upon being collected. The site map file is prepared by HTML, SGML or the like.

FIG. 25 illustrates one example of a site map file prepared by HTML.

In FIG. 25, <HTML>~</HTML>tags indicate that the file is an HTML document. The title, the characteristics and the like of the document are described between the <HEAD>tag and the </HEAD>tag. Items described between the <HEAD>tag and the </HEAD>tag are not displayed on a screen. The contents displayed on the screen are described between the <BODY>tag and the </BODY>tag.

In the site map file, identification characters indicating that the file is a site map file are described between the <HEAD>tag and </HEAD>tag. Specifically, the identification characters indicating that the file is a site map file are characters "DOCTYPE Geometry-File" in this example, and are described as a comment of HTML between the <HEAD>tag and </HEAD>tag.

A file to be recorded is described subsequently to the <DT>tag. Further, link information included in the file to be recorded is described subsequently to the <LI>tag. In the example shown in FIG. 25, seven URLs indicated by the following items (a) to (g) are included as URLs of files to be recorded. The link information included in the files to be recorded are described for each item as follows:

(a) index.html, . a.html . b.html (b) a.html a-1.html a-2.html (c) a-1.html . a-1-1.html (d) a-1-1.html (e) a-2.html (f) b.html . b-1.gif . a.html (g) b-1.gif Consequently, a link relationship represented by the site map file is the same as that shown in FIG. 13. Since <BASE HREF . . . >is described between the <HEAD>tag and the </HEAD>tag, the formal URL of each of the URLs is one obtained by adding "http://www.aaa.co.jp/" before the URL.

Figure 26:
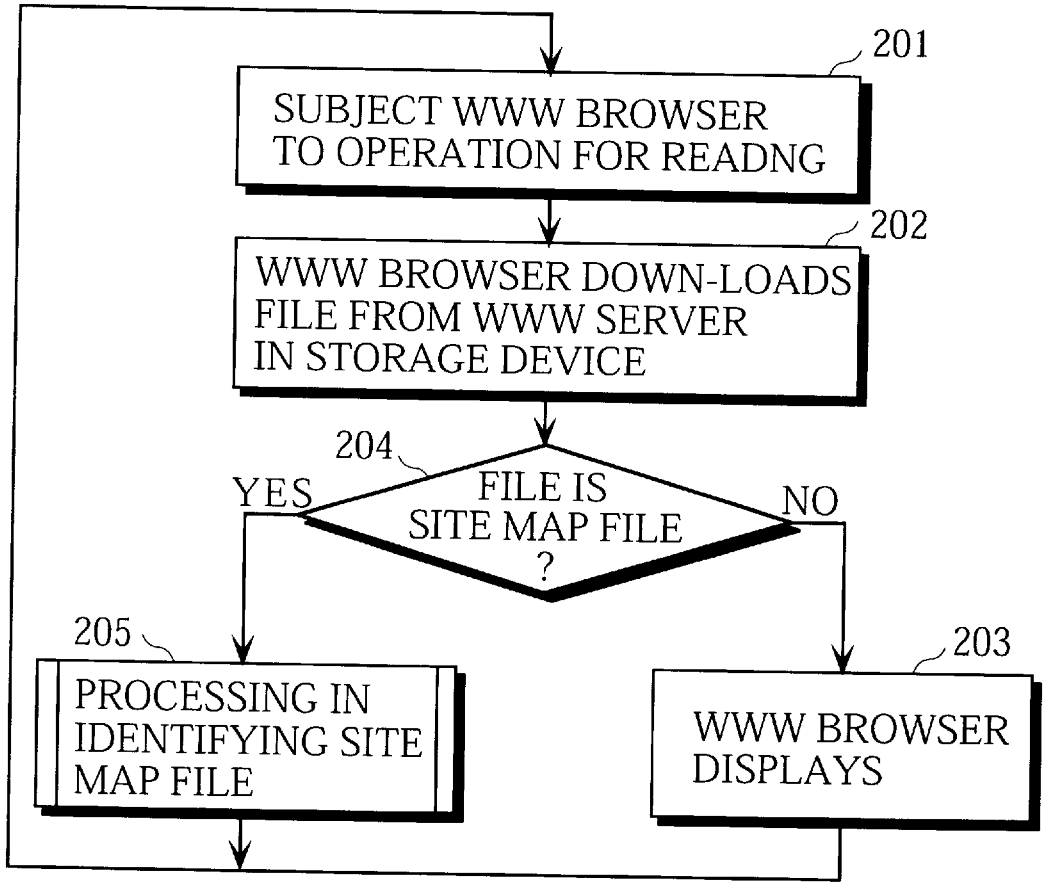
FIG. 26 is a flow chart showing the procedure for processing at the time of a browsing mode performed on the premise that a site map file is placed on one or a plurality of WWW servers.

FIG. 26 shows the procedure for processing at the time of a browsing mode performed on the premise that a site map file is placed on one or a plurality of WWW servers.

This processing is approximately the same as the processing shown in FIG. 4 except that it is judged whether or not a file down-loaded is a site map file, and processing at the time of identifying the site map file is performed when the down-loaded file is the site map file.

When the WWW browser is subjected to an operation for reading (step 201), and a corresponding file is sent from the WWW server 3, the file sent from the WWW server 3 is down-loaded in the storage device (the memory, the hard disk 14) by the WWW browser (step 202).

It is then judged whether or not the down-loaded file is a site map file (step 204). When the down-loaded file is not a site map file, the down-loaded file is displayed on the display 11 by the WWW browser (step 203). The program is then returned to the step 201.

When the down-loaded file is a site map file in the step 204, processing at the time of identifying the site map file is performed (step 205), after which the program is returned to the step 201.

Figure 27:
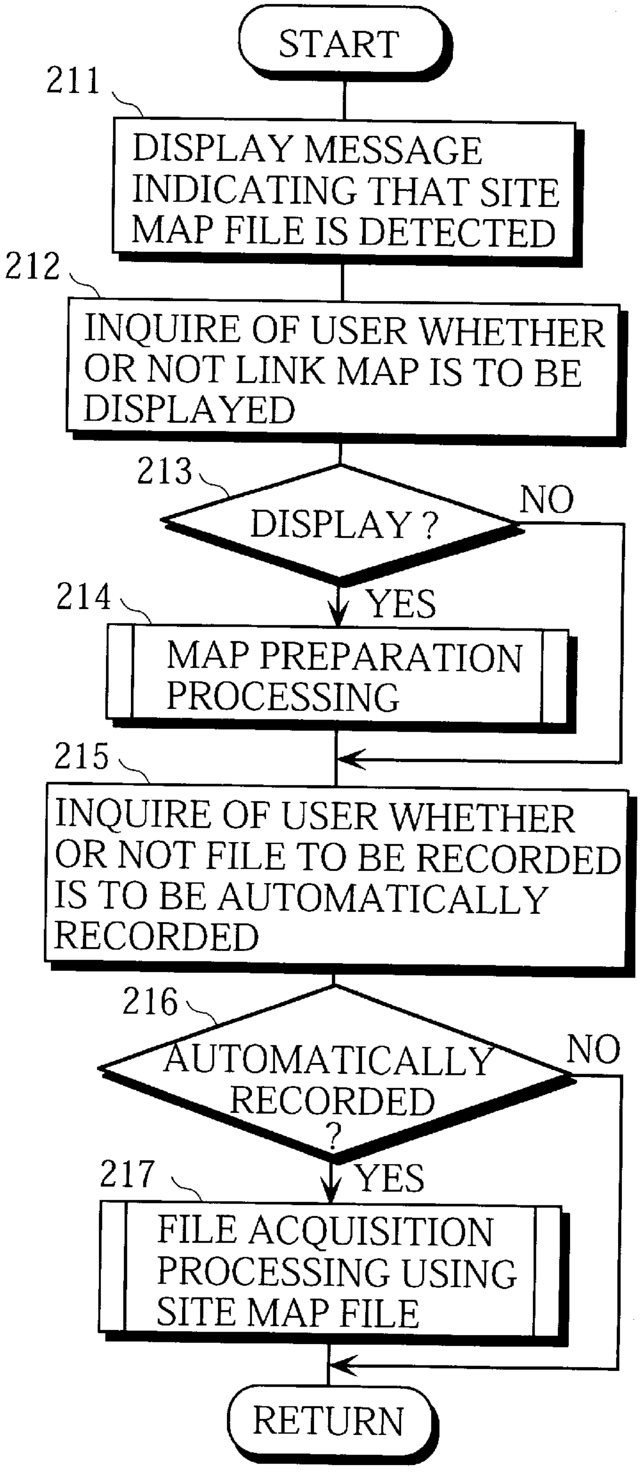
FIG. 27 is a flow chart showing the details of processing at the time of identifying a site map file in the step 205 shown in FIG. 26.

FIG. 27 shows the details of the processing at the time of identifying the site map file in the step 205 shown in FIG. 26.

In this processing, a message indicating that the site map file is detected is first displayed (step 211). Display for inquiring of a user whether or not a link map representing a link relationship described in the site map file is to be displayed is made (step 212).

When a user provides entry indicating that he or she desires to display a link map (YES in step 213), map preparation processing is performed on the basis of information representing the URLs of the files to be recorded and the link relationship described in the site map file down-loaded in the step 202 shown in FIG. 26 (step 214). The procedure for the map preparation processing is the same as the procedure described using FIG. 12. When the site map file is a file as shown in FIG. 4, a map as shown in FIG. 21 is prepared by the map preparation processing and is displayed. When the map is displayed, the program proceeds to the step 215.

When the user provides entry indicating that he or she does not desire to display a link map (NO in step 213), the program proceeds to the step 215 without performing the map preparation processing.

In the step 215, display for inquiring the user whether or not each of the files to be recorded which are described in the site map file is to be automatically recorded is made. When the user provides entry indicating that he or she desires automatic recording with respect to the display (YES in step 216), file acquisition processing using the site map file is performed on the basis of the URLs of the files to be recorded which are described in the site map file down-loaded in the step 202 shown in FIG. 26 (step 217). When the file acquisition processing is terminated, the program is returned to the step 201 shown in FIG. 26.

When the user provides entry indicating that he or she does not desire automatic recording in the step 216 (NO in step 216), the program is returned to the step 201 shown in FIG. 26 without performing the file acquisition processing using the site map file.

Figure 28:
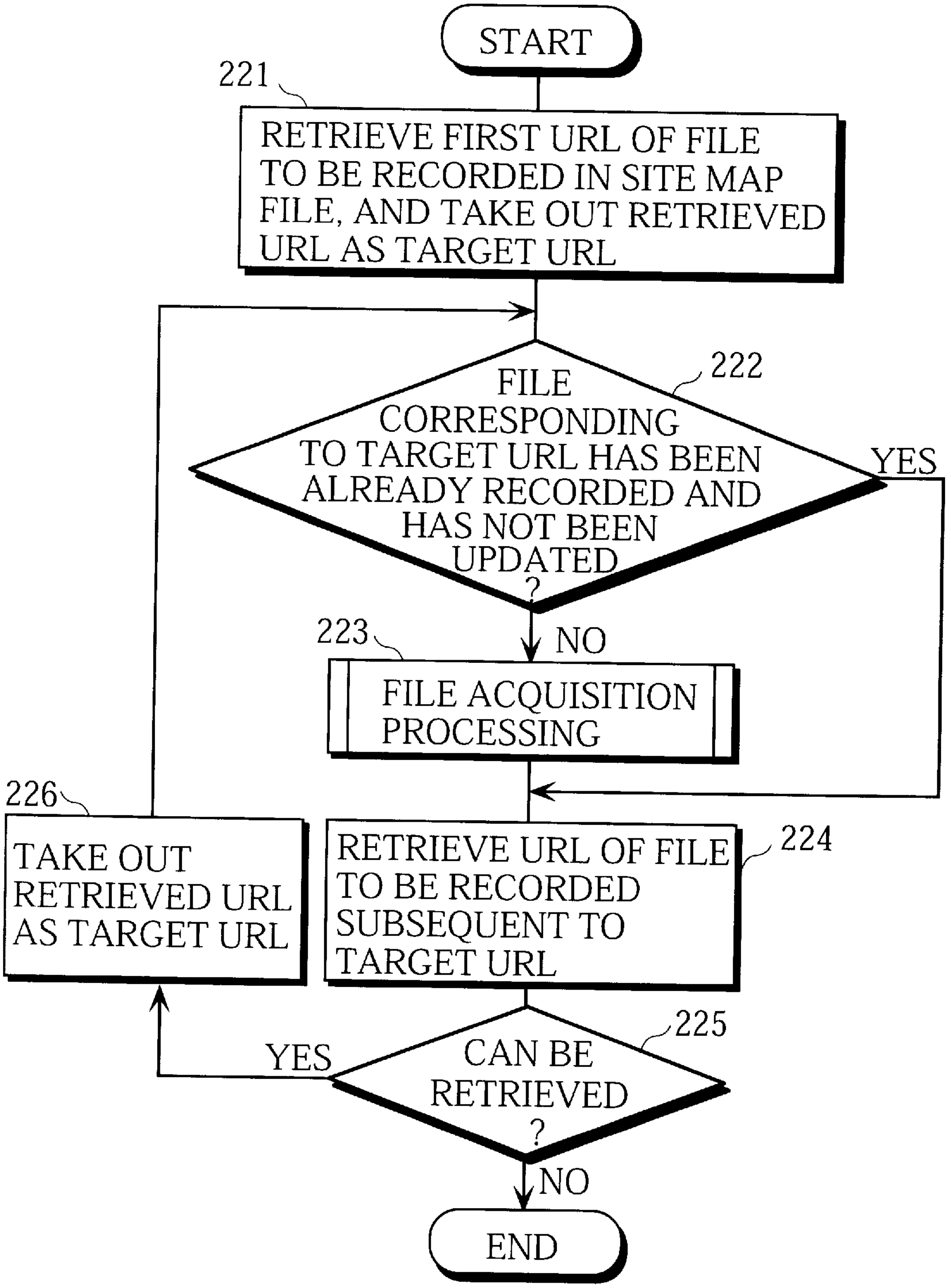
FIG. 28 is a flow chart showing the details of file acquisition processing using a site map file in the step 217 shown in FIG. 27.

FIG. 28 shows the details of the file acquisition processing using the site map file in the step 217 shown in FIG. 27.

In the file acquisition processing using the site map file, the URL of the file to be recorded which is first described in the site map file is retrieved, and the retrieved URL is taken out as a target URL (step 221). It is examined whether or not a file corresponding to the target URL taken out has been already recorded, and it is examined in a case where the file has been recorded whether or not the contents of a file having the same URL as that of the recorded file have been updated on the server side (step 222).

When the file corresponding to the target URL has not been recorded yet, or when in a case where the file has been recorded, the contents of the file having the same URL as that of the recorded file have been updated on the server side (NO in step 222), the program proceeds to the step 223.

In the step 223, file acquisition processing is performed, so that the file corresponding to the target URL is recorded. The procedure for the file accruing processing is the same as the procedure described using FIG. 7. In the step 31 shown in FIG. 7, the target URL is given to the WWW browser. When the file acquisition processing is terminated, the program proceeds to the step 224.

In the foregoing step 222, when the file corresponding to the target URL taken out has been already recorded, and the contents of the file having the same URL as that of the recorded file have not been updated on the server side (YES in step 222), the program proceeds to the step 224 without performing the file acquisition processing.

In the step 224, the URL of the file to be recorded subsequent to the target URL currently paid attention to is retrieved from the site map file. When the URL of the file to be recorded subsequent to the target URL can be retrieved (YES in step 225), the retrieved URL is taken out as a target URL (step 226), after which the program is returned to the step 222. The processing from the step 222 to the step 225 is performed again.

When the URL of the file to be recorded subsequent to the target URL cannot be retrieved in the step 224 (NO in step 225), the current file acquisition processing using the site map file is terminated. Consequently, the program is returned to the step 201 shown in FIG. 26.

Figure 29:
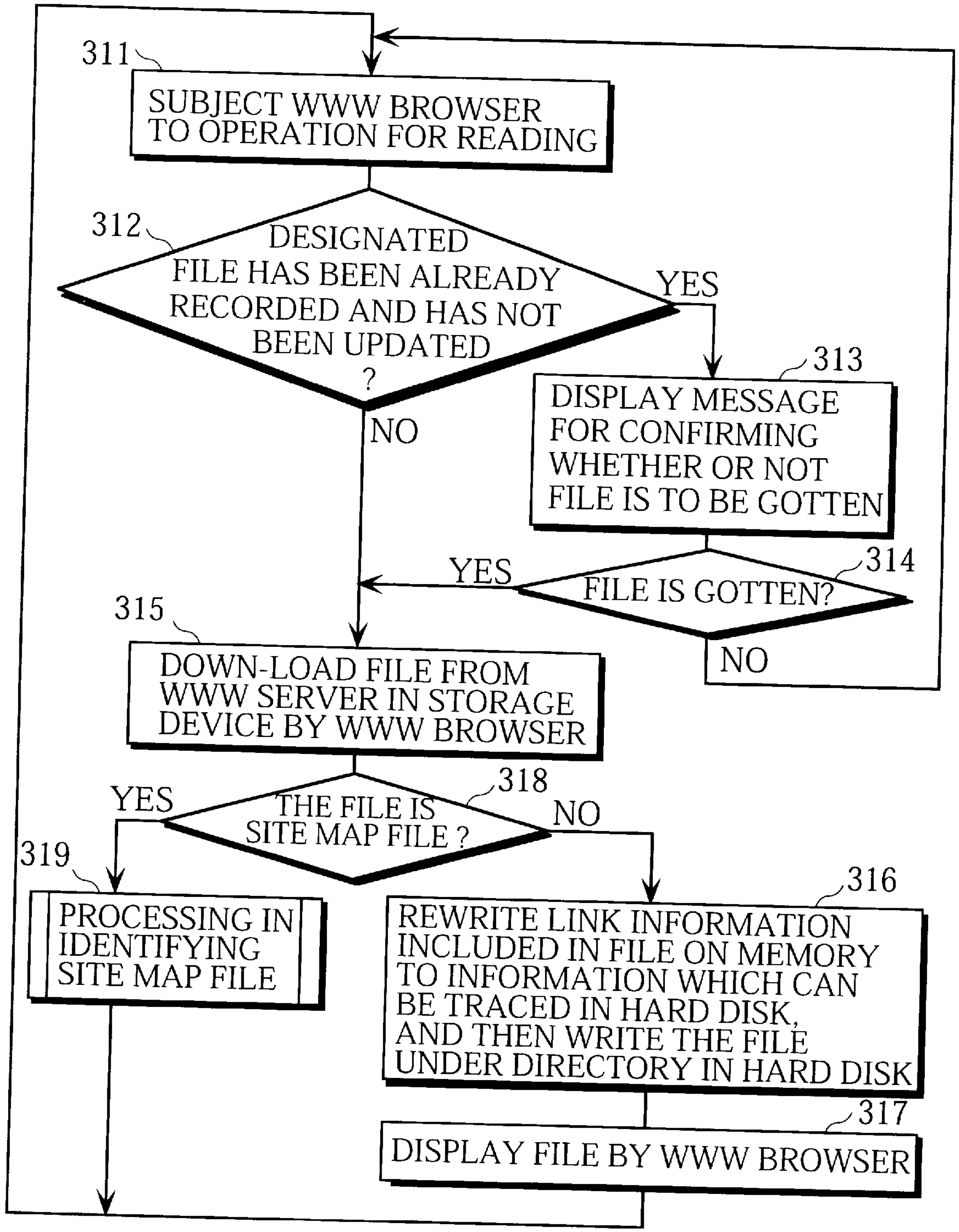
FIG. 29 is a flow chart showing the procedure for processing at the time of an immediate recording mode performed on the premise that a site map file is placed on one or a plurality of WWW servers.

FIG. 29 shows the procedure for processing at the time of an immediate recording mode performed on the premise that a site map file is placed on one or a plurality of WWW servers.

This processing is approximately the same as the processing shown in FIG. 5 except that it is judged whether or not a file down-loaded is a site map file, and processing at the time of identifying the site map file is performed when the down-loaded file is the site map file.

When the WWW browser is subjected to an operation for reading (step 311), it is examined whether or not a designated file has been already recorded, and it is examined in a case where the file has been recorded whether or not the contents of a file having the same URL as that of the recorded file have been updated on the server side (step 312). When the designated file has not been recorded yet, or when even in a case where the file has been recorded, the contents of a file having the same URL as that of the recorded file have been updated on the server side, the program proceeds to the step 315.

When the designated file has been already recorded, and the contents of the file having the same URL as that of the recorded file have not been updated on the server side, a message confirming whether or not the file is to be gotten is displayed (step 313). When the user chooses to get the file (YES in step 314) on the basis of the display, the program proceeds to the step 315. When the user chooses not to get the file (NO in step 314), the program is returned to the step 311.

In the step 315, a corresponding file is gotten from the WWW server 3, and the file sent from the WWW server 3 is down-loaded in the storage device by the WWW browser.

It is then judged whether or not the down-loaded file is a site map file (step 318). When the down-loaded file is not a site map file, link information included in the downloaded file is left as a comment in the file, and the link information included in the file, which represents the position of a file at a link destination placed on the side of the WWW server 3 on the internet, is rewritten to information representing the position where the file at the link destination is stored in the hard disk 14 on the side of the WWW client 1, after which the file is written under a directory corresponding to the URL of the file in the hard disk 14 (step 316).

Thereafter, the file down-loaded in the step 315 is displayed on the display 11 by the WWW browser (step 317). Thereafter, the program is returned to the step 311.

When the down-loaded file is a site map file in the step 318, processing at the time of identifying the site map file is performed (step 319), after which the program is returned to the step 311. The processing at the time of identifying the site map file is the same as the processing in the step 205 shown in FIG. 26 and hence, the description thereof is not repeated.

Figure 30:
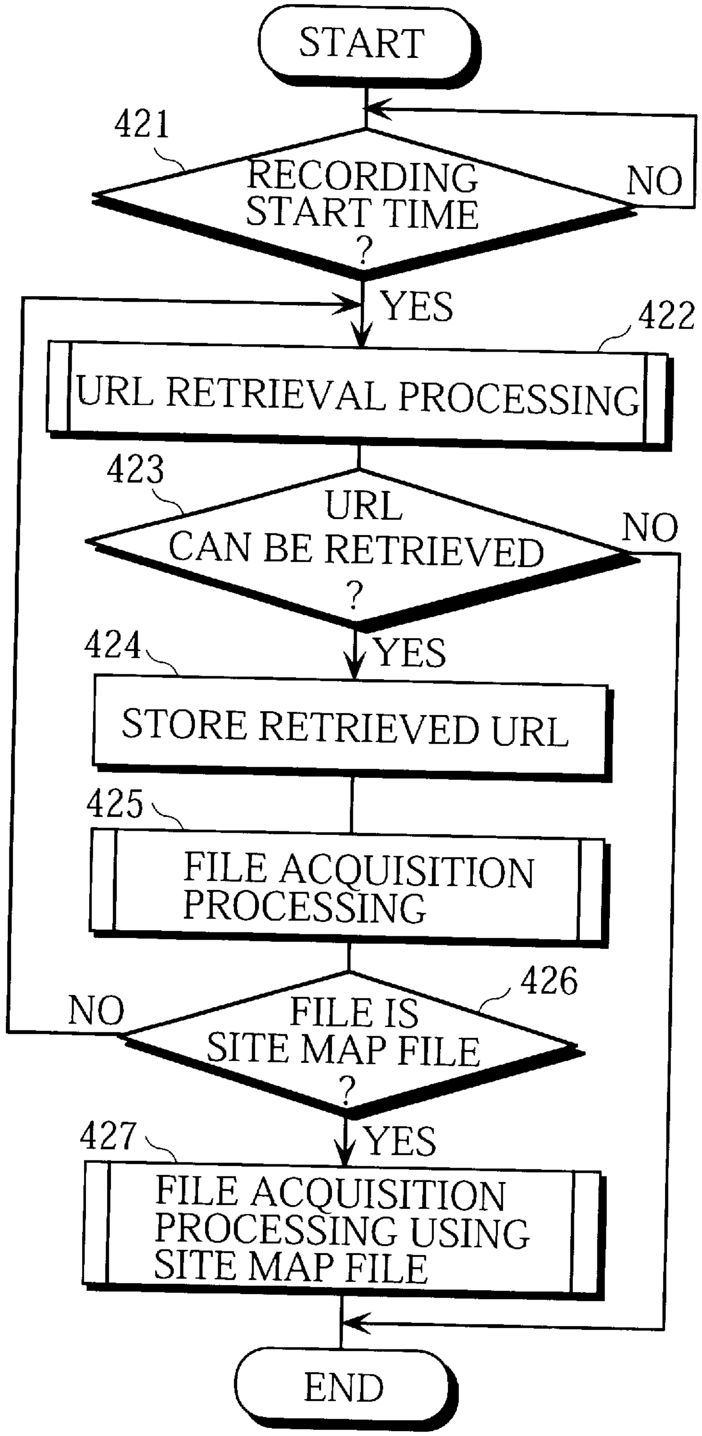
FIG. 30 is a flow chart showing the procedure for processing at the time of a reserved recording mode performed on the premise that a site map file is placed on one or a plurality of WWW servers.

FIG. 30 shows the procedure for processing at the time of a reserved recording mode performed on the premise that a site map file is placed on one or a plurality of WWW servers.

This processing is approximately the same as the processing shown in FIG. 6 except that it is judged whether or not a file acquired by the file acquisition processing in the step 25 shown in FIG. 6 is a site map file, and file acquisition processing using the site map file is performed when the file acquired by the file acquisition processing is the site map file.

When the set recording start time has come (step 421), retrieval processing of a URL of a file to be recorded at the time is performed (step 422). The procedure for the retrieval processing of the URL is the same as the procedure shown in FIG. 8.

When the URL can be retrieved by URL retrieval processing (YES in step 423), the retrieved URL is stored (step 424). Further, file acquisition processing for acquiring a file corresponding to the retrieved URL and recording the acquired file is performed (step 425). The procedure for the file acquisition processing is the same as the procedure shown in FIG. 7.

When the file acquisition processing is terminated, it is judged whether or not the file acquired by the file acquisition processing is a site map file (step 426). When the file acquired by the file acquisition processing is not a site map file, the program is returned to the step 422.

When the file acquired by the file acquisition processing is a site map file, file acquisition processing using the site map file is performed (step 427), after which the current processing is terminated. The file acquisition processing using the site map file is the same as the processing in the step 217 shown in FIG. 27. That is, the procedure for the file acquisition processing using the site map file is the same as the procedure described using FIG. 28.

When a list file, a link file and a site map file are created by HTML as in the above-mentioned embodiment, there are the following advantages. The first advantage is that the files can be created without changing the existing standards. The second advantage is that the files are easily created on the file creation side (on the server side), and the files are easily treated on the file utilization side (on the user side). The third advantage is that even in a case where the files are down-loaded in a client having no recording support program, the files are down-loaded as general HTML documents and are displayed. Therefore, the files are not interfered with even if they are down-loaded in the client having no recording support program.

The list file, the link file and the site map file may be created in a form other than HTML.

Although in the above-mentioned embodiment, access to the WWW server is made through the WWW browser, a file may be acquired by making the recording support program itself have the function of making access to the WWW server and directly making access to the WWW server from the recording support program without passing through the WWW browser.

Although the present invention has been described and illustrated in detail, it is clearly understood that the same is by way of illustration and example only and is not to be taken by way of limitation, the spirit and scope of the present invention being restricted only by the terms of the appended claims.

What is claimed is:

1. A file recording support apparatus for supporting recording of a file on a home page on an internet and an intranet, comprising:

means for entering a recording start command;

means for entering a recording stop command;

recording means for recording a file acquired from a server, together with link information included in the file, in storage means in a period elapsed from the time when the recording start command is entered until the recording stop command is entered; and means for producing a figure representing the linked state of the files recorded by the recording means and displaying the produced figure.

2. The file recording support apparatus according to claim 1, further comprising means for reading the file recorded by the recording means.

3. The file recording support apparatus according to claim 1, further comprising means for retrieving a desired file out of the files recorded by the recording means on the basis of an entered keyword for retrieval.

4. A file recording support apparatus for supporting recording of a file on a home page on an internet and an intranet, comprising:

setting means for setting the recording start time and an URL (Uniform Resource Locator) of a file whose recording is reserved;

means for acquiring a file corresponding to the URL set in the setting means from a server when the recording start time set in the setting means has come;

recording means for recording the acquired file, together with link information included in the file, in storage means; and means for producing a figure representing the linked state of the files recorded by the recording means and displaying the produced figure.

5. The file recording support apparatus according to claim 4, further comprising means for reading the file recorded by the recording means.

6. The file recording support apparatus according to claim 4, further comprising means for retrieving a desired file out of the files recorded by the recording means on the basis of an entered keyword for retrieval.

7. A file recording support apparatus for supporting recording of a file on a home page on an internet and an intranet, comprising:

setting means for setting the recording start time and an URL of a file whose recording is reserved;

means for acquiring a file corresponding to the URL set in the setting means when the recording start time set in the setting means has come;

means for acquiring from a server a file at a link destination within a predetermined range out of link destinations;

recording means for recording the acquired file, together with link information included in the file, in storage means; and means for producing a figure representing the linked state of the files recorded by the recording means and displaying the produced figure.

8. The file recording support apparatus according to claim 7, further comprising means for reading the files recorded by recording means.

9. The file recording support apparatus according to claim 7, further comprising means for retrieving a desired file out of the files recorded by the recording means on the basis of an entered keyword for retrieval.

10. In a system in which a link file describing a link relationship among all files provided by a server or a link relationship among parts of all the files provided by the server is placed on the server, a file recording support apparatus for supporting recording of a file on a home page on an internet and an intranet, comprising:

means for acquiring the link file from said server; and means for producing a figure representing the link relationship among all the files provided by said server or the link relationship among parts of all the files provided by the server and displaying the produced figure on the basis of the acquired link file.

11. In a system in which a link file describing a link relationship among files in a predetermined group selected out of files provided by all servers on a network is placed on the predetermined server, a file recording support apparatus for supporting recording of a file on a home page on an internet and an intranet, comprising:

means for acquiring the link file from the server on which it is placed; and means for producing a figure representing the link relationship among the files in the predetermined group and displaying the produced figure on the basis of the acquired link file.

12. In a system in which a site map file describing URLs of files in a predetermined group selected out of files provided by all servers on a network and all or parts of link information included in the files is placed on the predetermined server, a file recording support apparatus for supporting recording of a file on a home page on an internet and an intranet, comprising:

means for acquiring the site map file from the server on which it is placed;

means for producing a figure representing a link relationship among the files in the predetermined group and displaying the produced figure on the basis of the URLs and the link information included in the site map file; and recording means for acquiring files corresponding to the URLs included in the site map file from the servers on which the files are placed on the network and recording the acquired files, together with link information included in the files, in storage means.

13. A file recording support system for supporting recording of a file on a home page on an internet and an intranet, comprising:

a server device; and a client device connected to the server device through a network, a link file describing a link relationship among all files provided by said server device and a link relationship among parts of all the files provided by the server device being held in the server device, the client device comprising means for acquiring the link file from said server device, and means for producing a figure representing the link relationship among all the files provided by the server device or the link relationship among parts of all the files provided by the server device and displaying the produced figure.

14. A file recording support system for supporting recording of a file on a home page on an internet and an intranet, comprising:

server devices; and a client device connected to the server devices through a network, a link file describing a link relationship among files in a predetermined group selected out of files provided by all the server devices on the network being held in the predetermined server device, the client device comprising means for acquiring the link file from the server device on which it is placed, and means for producing a figure representing the link relationship among the files in the predetermined group and displaying the produced figure on the basis of the acquired link file.

15. A file recording support system for supporting recording of a file on a home page on an internet and an intranet, comprising:

server devices; and a client device connected to the server devices through a network, a site map file describing URLs of files in a predetermined group selected out of files provided by all the server devices on the network and all or parts of link information included in the files being held in the predetermined server device, the client device comprising means for acquiring the site map file from the server device on which it is placed, means for producing a figure representing a link relationship among the files in the predetermined group and displaying the produced figure on the basis of the URLs and the link information included in the site map file, and recording means for acquiring files corresponding to the URLs included in the site map file from the server devices on which the files are placed and recording the acquired files, together with link information included in the files, in storage means.

* * * * *